United States Patent
Yu et al.

(10) Patent No.: US 12,483,364 B2
(45) Date of Patent: Nov. 25, 2025

(54) BANDWIDTH INDICATION METHOD APPLIED IN WIRELESS LOCAL AREA NETWORK AND COMMUNICATION APPARATUS

(71) Applicant: HUAWEI TECHNOLOGIES CO., LTD., Guangdong (CN)

(72) Inventors: Jian Yu, Shenzhen (CN); Mengshi Hu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 17/976,225

(22) Filed: Oct. 28, 2022

(65) Prior Publication Data

US 2023/0061290 A1    Mar. 2, 2023

Related U.S. Application Data

(63) Continuation of application No. PCT/CN2021/078870, filed on Mar. 3, 2021.

(30) Foreign Application Priority Data

Apr. 30, 2020    (CN) .......................... 202010366775.6

(51) Int. Cl.
*H04W 4/00* (2018.01)
*H04L 5/00* (2006.01)
*H04W 84/12* (2009.01)

(52) U.S. Cl.
CPC .......... *H04L 5/0044* (2013.01); *H04L 5/0094* (2013.01); *H04W 84/12* (2013.01)

(58) Field of Classification Search
CPC .... H04L 5/0044; H04L 5/0094; H04W 84/12; H04W 28/20; H04B 7/0452
See application file for complete search history.

(56) References Cited

U.S. PATENT DOCUMENTS

| | | | |
|---|---|---|---|
| 10,904,061 | B2 | 1/2021 | Yang et al. |
| 2016/0330300 | A1 | 11/2016 | Josiam et al. |

(Continued)

FOREIGN PATENT DOCUMENTS

| | | |
|---|---|---|
| CN | 106685618 A | 5/2017 |
| CN | 110768757 A | 2/2020 |

(Continued)

OTHER PUBLICATIONS

Liu et al., "On RU Allocation Singling in EHT-SIG," IEEE 802.11-19/0578r0, Mar. 31, 2020, 8 pages.

(Continued)

*Primary Examiner* — Thai Dinh Hoang
(74) *Attorney, Agent, or Firm* — Fish & Richardson P.C.

(57) ABSTRACT

This application provides bandwidth indication methods and communication apparatuses and can be applied, for example, in a wireless local area network supporting IEEE 802.11be standard. In an example method, an access point generates a physical layer protocol data unit (PPDU), where a transmission bandwidth of the PPDU is divided into a plurality of segments, the PPDU includes a universal signal (U-SIG) field carried on a segment, the U-SIG field includes a bandwidth field, and the bandwidth field indicates a channel bandwidth of a resource unit allocated to a station parked in the segment. The access point sends the PPDU to the station.

18 Claims, 28 Drawing Sheets

(56) References Cited

U.S. PATENT DOCUMENTS

| | | | |
|---|---|---|---|
| 2018/0278302 | A1 | 9/2018 | Hedayat |
| 2019/0097850 | A1 | 3/2019 | Kenney et al. |
| 2019/0141570 | A1 | 5/2019 | Verma et al. |
| 2019/0222392 | A1 | 7/2019 | Lin et al. |
| 2020/0007265 | A1 | 1/2020 | Min et al. |
| 2020/0136884 | A1 | 4/2020 | Park et al. |
| 2021/0045117 | A1* | 2/2021 | Chen .................. H04W 74/002 |
| 2021/0045151 | A1* | 2/2021 | Chen .................... H04W 72/23 |
| 2021/0250119 | A1* | 8/2021 | Noh ...................... H04L 1/0033 |
| 2021/0266098 | A1* | 8/2021 | Cao ....................... H04L 1/0643 |
| 2021/0377971 | A1* | 12/2021 | Park ..................... H04W 74/006 |
| 2023/0061290 | A1 | 3/2023 | Yu et al. |
| 2023/0096177 | A1 | 3/2023 | Yu et al. |

FOREIGN PATENT DOCUMENTS

| | | | | | |
|---|---|---|---|---|---|
| WO | WO-2021030233 | A1 * | 2/2021 | ........... | H04L 1/0013 |
| WO | WO-2021081462 | A2 * | 4/2021 | ........... | H04B 7/0452 |
| WO | WO-2021162632 | A1 * | 8/2021 | ........... | H04B 7/0452 |
| WO | WO-2021183046 | A1 * | 9/2021 | ........... | H04L 1/0003 |

OTHER PUBLICATIONS

Office Action in Japanese Appln. No. 2022-566285, mailed on Jan. 9, 2024, 10 pages (with English translation).

Yu et al., "U-SIG and SIG Contents," IEEE 802.11-20/0402r0, Mar. 13, 2020, 8 pages.

IEEE P802.11ax/D4.3, "Draft Standard for Information technology—Tele-communications and information exchange between systems Local and metropolitan area networks—Specific requirements," Aug. 2019, 782 pages.

IEEE Std 802.11-2016, "IEEE Standard for Information technology—Telecommunications and information exchange between systems Local and metropolitan area networks—Specific requirements, Part 11: Wireless LAN Medium Access Control (MAC) and Physical Layer (PHY) Specifications," Dec. 7, 2016, 3534 pages.

International Search Report and Written Opinion in International Appln. No. PCT/CN2021/078870, mailed on May 25, 2021, 22 pages (with English translation).

Vermani et al., "PPDU Types and U-SIG Content," IEEE 802.11-20/0049r2, Jan. 13, 2020, 24 pages.

Extended European Search Report in European Appln No. 21795585.5, dated Sep. 6, 2023, 10 pages.

\* cited by examiner

| | | | | |
|---|---|---|---|---|
| CC1 | Resource unit allocation subfield in 1# 242-tone RU | Resource unit allocation subfield in 3# 242-tone RU | Center 26-tone RU indication | CRC+Tail | User fields in 1# and 3# 242-tone RUs |
| CC2 | Resource unit allocation subfield in 2# 242-tone RU | Resource unit allocation subfield in 4# 242-tone RU | Center 26-tone RU indication | CRC+Tail | User fields in 2# and 4# 242-tone RUs |
| CC1 | Resource unit allocation subfield in 1# 242-tone RU | Resource unit allocation subfield in 3# 242-tone RU | Center 26-tone RU indication | CRC+Tail | User fields in 1# and 3# 242-tone RUs |
| CC2 | Resource unit allocation subfield in 2# 242-tone RU | Resource unit allocation subfield in 4# 242-tone RU | Center 26-tone RU indication | CRC+Tail | User fields in 2# and 4# 242-tone RUs |

FIG. 3

| CC1 | Resource unit allocation subfield in 1# 242-tone RU | Center 26-tone RU indication | CRC+Tail | User field in 1# 242-tone RU |
|---|---|---|---|---|

FIG. 7

| CC1 | Resource unit allocation subfield in 1# 242-tone RU | Center 26-tone RU indication | CRC+Tail | User field in 1# 242-tone RU |
|---|---|---|---|---|

| CC2 | Resource unit allocation subfield in 2# 242-tone RU | Center 26-tone RU indication | CRC+Tail | User field in 2# 242-tone RU |
|---|---|---|---|---|

FIG. 8

| | Resource unit allocation subfield in 1# 242-tone RU | Resource unit allocation subfield in 3# 242-tone RU | Resource unit allocation subfield in 5# 242-tone RU | Resource unit allocation subfield in 7# 242-tone RU | Center 26-tone RU indication | CRC+Tail | User fields in 1#, 3#, 5#, and 7# 242-tone RUs |
|---|---|---|---|---|---|---|---|
| CC1 | | | | | | | |
| CC2 | Resource unit allocation subfield in 2# 242-tone RU | Resource unit allocation subfield in 4# 242-tone RU | Resource unit allocation subfield in 6# 242-tone RU | Resource unit allocation subfield in 8# 242-tone RU | Center 26-tone RU indication | CRC+Tail | User fields in 2#, 4#, 6#, and 8# 242-tone RUs |
| CC1 | Resource unit allocation subfield in 1# 242-tone RU | Resource unit allocation subfield in 3# 242-tone RU | Resource unit allocation subfield in 5# 242-tone RU | Resource unit allocation subfield in 7# 242-tone RU | Center 26-tone RU indication | CRC+Tail | User fields in 1#, 3#, 5#, and 7# 242-tone RUs |
| CC2 | Resource unit allocation subfield in 2# 242-tone RU | Resource unit allocation subfield in 4# 242-tone RU | Resource unit allocation subfield in 6# 242-tone RU | Resource unit allocation subfield in 8# 242-tone RU | Center 26-tone RU indication | CRC+Tail | User fields in 2#, 4#, 6#, and 8# 242-tone RUs |
| CC1 | Resource unit allocation subfield in 1# 242-tone RU | Resource unit allocation subfield in 3# 242-tone RU | Resource unit allocation subfield in 5# 242-tone RU | Resource unit allocation subfield in 7# 242-tone RU | Center 26-tone RU indication | CRC+Tail | User fields in 1#, 3#, 5#, and 7# 242-tone RUs |
| CC2 | Resource unit allocation subfield in 2# 242-tone RU | Resource unit allocation subfield in 4# 242-tone RU | Resource unit allocation subfield in 6# 242-tone RU | Resource unit allocation subfield in 8# 242-tone RU | Center 26-tone RU indication | CRC+Tail | User fields in 2#, 4#, 6#, and 8# 242-tone RUs |
| CC1 | Resource unit allocation subfield in 1# 242-tone RU | Resource unit allocation subfield in 3# 242-tone RU | Resource unit allocation subfield in 5# 242-tone RU | Resource unit allocation subfield in 7# 242-tone RU | Center 26-tone RU indication | CRC+Tail | User fields in 1#, 3#, 5#, and 7# 242-tone RUs |
| CC2 | Resource unit allocation subfield in 2# 242-tone RU | Resource unit allocation subfield in 4# 242-tone RU | Resource unit allocation subfield in 6# 242-tone RU | Resource unit allocation subfield in 8# 242-tone RU | Center 26-tone RU indication | CRC+Tail | User fields in 2#, 4#, 6#, and 8# 242-tone RUs |

FIG. 9

| | Resource unit allocation subfield in 1# 242-tone RU | Resource unit allocation subfield in 3# 242-tone RU | Center 26-tone RU indication | CRC+Tail | User fields in 1# and 3# 242-tone RUs |
|---|---|---|---|---|---|
| CC11 | | | | | |

| | Resource unit allocation subfield in 2# 242-tone RU | Resource unit allocation subfield in 4# 242-tone RU | Center 26-tone RU indication | CRC+Tail | User fields in 2# and 4# 242-tone RUs |
|---|---|---|---|---|---|
| CC12 | | | | | |

| | Resource unit allocation subfield in 1# 242-tone RU | Resource unit allocation subfield in 3# 242-tone RU | Center 26-tone RU indication | CRC+Tail | User fields in 1# and 3# 242-tone RUs |
|---|---|---|---|---|---|
| CC11 | | | | | |

| | Resource unit allocation subfield in 2# 242-tone RU | Resource unit allocation subfield in 4# 242-tone RU | Center 26-tone RU indication | CRC+Tail | User fields in 2# and 4# 242-tone RUs |
|---|---|---|---|---|---|
| CC12 | | | | | |

FIG. 21

| | Resource unit allocation subfield in 5# 242-tone RU | Resource unit allocation subfield in 7# 242-tone RU | Center 26-tone RU indication | CRC+Tail | User fields in 5# and 7# 242-tone RUs |
|---|---|---|---|---|---|
| CC21 | | | | | |

| | Resource unit allocation subfield in 6# 242-tone RU | Resource unit allocation subfield in 8# 242-tone RU | Center 26-tone RU indication | CRC+Tail | User fields in 6# and 8# 242-tone RUs |
|---|---|---|---|---|---|
| CC22 | | | | | |

| | Resource unit allocation subfield in 5# 242-tone RU | Resource unit allocation subfield in 7# 242-tone RU | Center 26-tone RU indication | CRC+Tail | User fields in 5# and 7# 242-tone RUs |
|---|---|---|---|---|---|
| CC21 | | | | | |

| | Resource unit allocation subfield in 6# 242-tone RU | Resource unit allocation subfield in 8# 242-tone RU | Center 26-tone RU indication | CRC+Tail | User fields in 6# and 8# 242-tone RUs |
|---|---|---|---|---|---|
| CC22 | | | | | |

FIG. 22

| | Resource unit allocation subfield in 9# 242-tone RU | Resource unit allocation subfield in 11# 242-tone RU | Resource unit allocation subfield in 13# 242-tone RU | Resource unit allocation subfield in 15# 242-tone RU | Center 26-tone RU indication | CRC +Tail | User fields in 9#, 11#, 13#, and 15# 242-tone RUs |
|---|---|---|---|---|---|---|---|
| CC31 | | | | | | | |
| CC32 | Resource unit allocation subfield in 10# 242-tone RU | Resource unit allocation subfield in 12# 242-tone RU | Resource unit allocation subfield in 14# 242-tone RU | Resource unit allocation subfield in 16# 242-tone RU | Center 26-tone RU indication | CRC +Tail | User fields in 10#, 12#, 14#, and 16# 242-tone RUs |
| CC31 | Resource unit allocation subfield in 9# 242-tone RU | Resource unit allocation subfield in 11# 242-tone RU | Resource unit allocation subfield in 13# 242-tone RU | Resource unit allocation subfield in 15# 242-tone RU | Center 26-tone RU indication | CRC +Tail | User fields in 9#, 11#, 13#, and 15# 242-tone RUs |
| CC32 | Resource unit allocation subfield in 10# 242-tone RU | Resource unit allocation subfield in 12# 242-tone RU | Resource unit allocation subfield in 14# 242-tone RU | Resource unit allocation subfield in 16# 242-tone RU | Center 26-tone RU indication | CRC +Tail | User fields in 10#, 12#, 14#, and 16# 242-tone RUs |

FIG. 23

| | | | |
|---|---|---|---|
| CC41 | Resource unit allocation subfield in 17# 242-tone RU | Resource unit allocation subfield in 19# 242-tone RU | Center 26-tone RU indication | CRC+Tail | User fields in 17# and 19# 242-tone RUs |
| CC42 | Resource unit allocation subfield in 18# 242-tone RU | Resource unit allocation subfield in 20# 242-tone RU | Center 26-tone RU indication | CRC+Tail | User fields in 18# and 20# 242-tone RUs |
| CC41 | Resource unit allocation subfield in 17# 242-tone RU | Resource unit allocation subfield in 19# 242-tone RU | Center 26-tone RU indication | CRC+Tail | User fields in 17# and 19# 242-tone RUs |
| CC42 | Resource unit allocation subfield in 18# 242-tone RU | Resource unit allocation subfield in 20# 242-tone RU | Center 26-tone RU indication | CRC+Tail | User fields in 18# and 20# 242-tone RUs |

FIG. 24

| | | | | |
|---|---|---|---|---|
| Stations 1 to 5<br><br>Segment 1<br><br>Bandwidth field 1 indicates 80 MHz | Channel 16 | U-SIG field 1 (bandwidth field 1) | EHT-SIG field 1 (CC11) | Data part 1 (Stations 1 to 5) MU MIMO |
| | Channel 15 | U-SIG field 1 (bandwidth field 1) | EHT-SIG field 1 (CC12) | |
| | Channel 14 | U-SIG field 1 (bandwidth field 1) | EHT-SIG field 1 (CC11) | |
| | Channel 13 | U-SIG field 1 (bandwidth field 1) | EHT-SIG field 1 (CC12) | |
| Stations 6 and 7<br><br>Segment 2<br><br>Bandwidth field 2 indicates 80 MHz | Channel 12 | U-SIG field 2 (bandwidth field 2) | EHT-SIG field 2 (CC21) | Data part 2 (Station 6) |
| | Channel 11 | U-SIG field 2 (bandwidth field 2) | EHT-SIG field 2 (CC22) | |
| | Channel 10 | U-SIG field 2 (bandwidth field 2) | EHT-SIG field 2 (CC21) | Data part 3 (Station 7) |
| | Channel 9 | U-SIG field 2 (bandwidth field 2) | EHT-SIG field 2 (CC22) | |
| Stations 8 and 9<br><br>Segment 3<br><br>Bandwidth field 3 indicates 160 MHz | Channel 8 | U-SIG field 3 (bandwidth field 3) | EHT-SIG field 3 (CC31) | Data part 4 (Station 8) |
| | Channel 7 | U-SIG field 3 (bandwidth field 3) | EHT-SIG field 3 (CC32) | |
| | Channel 6 | U-SIG field 3 (bandwidth field 3) | EHT-SIG field 3 (CC31) | Data part 5 (Station 9) |
| | Channel 5 | U-SIG field 3 (bandwidth field 3) | EHT-SIG field 3 (CC32) | |
| Station 10<br><br>Segment 4<br><br>Bandwidth field 4 indicates 80 MHz | Channel 4 | U-SIG field 4 (bandwidth field 4) | EHT-SIG field 4 (CC41) | Data part 6 (Station 10) |
| | Channel 3 | U-SIG field 4 (bandwidth field 4) | EHT-SIG field 4 (CC42) | |
| | Channel 2 | U-SIG field 4 (bandwidth field 4) | EHT-SIG field 4 (CC41) | Data part 4 (Station 8) |
| | Channel 1 | U-SIG field 4 (bandwidth field 4) | EHT-SIG field 4 (CC42) | |

FIG. 27

BANDWIDTH INDICATION METHOD APPLIED IN WIRELESS LOCAL AREA NETWORK AND COMMUNICATION APPARATUS

CROSS-REFERENCE TO RELATED APPLICATIONS

This application is a continuation of International Application No. PCT/CN2021/078870, filed on Mar. 3, 2021, which claims priority to Chinese Patent Application No. 202010366775.6, filed on Apr. 30, 2020. The disclosures of the aforementioned applications are hereby incorporated by reference in their entireties.

TECHNICAL FIELD

The present invention relates to the communication field, and in particular, to a bandwidth indication method applied in a wireless local area network and a communication apparatus.

BACKGROUND

WLAN standards have evolved over many generations, including 802.11a/b/g, 802.11n, 802.11ac, 802.11ax, and 802.11be (also known as Wi-Fi 7) under discussion. The 802.11n, 802.11ac, 802.11ax, and 802.11be standards are also referred to as an HT (High Throughput, high throughput) technology, a VHT (Very High Throughput, very high throughput) technology, an HE (High Efficient, high efficient) technology, and an EHT (Extremely High Throughput, extremely high throughput) technology respectively.

The 802.11ax standard supports the following bandwidth configurations: 20 MHz, 40 MHz, 80 MHz, 160 MHz, and 80+80 MHz. A difference between 160 MHz and 80+80 MHz is that a frequency band of 160 MHz is continuous, but frequency bands of 80+80 MHz may be separated. The 802.11be standard supports 240 MHz, 320 MHz, and the like.

User frequency band resources are allocated by resource units (resource unit, RU) instead of 20-MHz channels. An RU may have the following forms, for example, a 26-tone RU, a 52-tone RU, a 106-tone RU, a 242-tone RU, a 484-tone RU, and a 996-tone RU, where tone represents a subcarrier. For example, FIG. 1 is a schematic diagram of subcarrier and RU distribution at a bandwidth of 80 MHz. As shown in FIG. 1, the entire bandwidth of 80 MHz includes four resource units in a form of 242-tone RUs. Particularly, there is a center 26-tone RU including two 13-tone subunits in the middle of the entire bandwidth. Alternatively, the entire bandwidth may include one entire 996-tone RU, or may include various combinations of 26-tone RUs, 52-tone RUs, 106-tone RUs, 242-tone RUs, and 484-tone RUs.

The 802.11ax standard provides a downlink (downlink, DL) orthogonal frequency division multiple access (orthogonal frequency division multiple access, OFDMA) resource unit indication method and a downlink (downlink, DL) multi-user (multiple user, MU) multiple-input multiple-output (multiple input multiple output, MIMO) resource unit indication method. In the 802.11ax standard, a transmit end sends a physical layer protocol data unit (physical protocol data unit, PPDU). The PPDU includes a high efficiency signal field-A (high efficiency-signal field-A) and a high efficiency signal field-B (high efficiency-signal field-B). The HE-SIG-A is used to indicate a symbol length and a modulation and coding scheme (modulation and coding scheme, MCS) of the HE-SIG-B, a bandwidth of the entire PPDU, and the like. If the bandwidth of the PPDU is greater than 20 MHz, the HE-SIG-A is duplicated at each channel of 20 MHz for transmission. The PPDU further includes the HE-SIG-B, which provides DL MU MIMO and DL OFDMA resource indication information. The HE-SIG-B is individually encoded at each channel of 20 MHz. A coding structure of the HE-SIG-B at each channel of 20 MHz is shown in FIG. 2. The entire HE-SIG-B is divided into two parts: a common field (common field) and a user-specific field (user-specific field). The common field includes 1 to N resource unit allocation subfields (RU allocation subfields), a center 26-tone (Center 26-Tone) resource unit allocation subfield included at a bandwidth greater than or equal to 80 MHz, a cyclic redundancy code (Cyclic Redundancy Code, CRC), and a tail (Tail) subfield for cyclic decoding. The user-specific field includes 1 to M user fields (user field) according to an allocation sequence of resource units. In the M user fields, two user fields constitute a group, followed by a CRC field and a tail field, but the last group is not the case. In the last group, there may be one or two user fields.

A concept of content channel (content channel, CC) is introduced in the 802.11ax standard. FIG. 3 is a schematic diagram of an HE-SIG-B field at an 80-MHz bandwidth of a PPDU. As shown in FIG. 3, at the 80-MHz bandwidth of the PPDU, the HE-SIG-B field includes two CCs involving four channels in total. A structure of a CC1, a CC2, a CC1 and a CC2, which are sequenced based on frequencies in ascending order, is used to indicate resource unit allocation information on the four channels. The CC1 includes resource unit allocation subfields within 1# 242-tone RU and 3# 242-tone RU, and corresponding user fields. The CC2 includes resource unit allocation subfields within 2# 242-tone RU and 4# 242-tone RU, and corresponding user fields. In addition, a center 26-tone RU indication at the 80 MHz-bandwidth is carried on each of the two CCs, to indicate whether the resource unit is used for data transmission. Similarly, at a 160-MHz bandwidth of a PPDU, the HE-SIG-B field includes two CCs, involving eight channels in total. A structure of a CC1, a CC2, a CC1, a CC2, a CC1, a CC2, a CC1, and a CC2, which are sequenced based on frequencies in ascending order, is used to indicate resource unit allocation information on the eight channels. The CC1 includes resource unit allocation subfields within 1# 242-tone RU, 3# 242-tone RU, 5# 242-tone RU, and 7# 242-tone RU, and corresponding user fields. The CC2 includes resource unit allocation subfields within 2# 242-tone RU, 4# 242-tone RU, 6# 242-tone RU, and 8# 242-tone RU, and corresponding user fields.

In conclusion, in the conventional technology, resource unit indication at the bandwidth of 20 MHz to 160 MHz is implemented, but overheads are large. In the 802.11be standard (Wi-Fi 7) or a later standard (for example, Wi-Fi 8), the transmission bandwidth of the PPDU may be 240 MHz, 320 MHz, or more. In this case, resource unit indication in a PPDU increases exponentially. Therefore, how to reduce signaling overheads of PPDU transmission of a PPDU is an urgent problem that needs to be resolved at present.

SUMMARY

Embodiments of the present invention provide a bandwidth indication method applied in a wireless local area network and a communication apparatus, to help reduce signaling overheads of PPDU transmission.

According to a first aspect, this application provides a bandwidth indication method applied in a wireless local area network. The method includes: An access point generates a physical layer protocol data unit PPDU, where a transmission bandwidth of the PPDU is divided into a plurality of segments, the PPDU includes a universal signal U-SIG field carried on a segment, the U-SIG field includes a bandwidth field, and the bandwidth field indicates a channel bandwidth of a resource unit allocated to a station parked in the segment; and the access point sends the PPDU to the station.

Based on the method described in the first aspect, the bandwidth field of the segment is set to indicate the channel bandwidth of the resource unit allocated to the station in the segment, so that a quantity of resource unit allocation subfields included in an EHT-SIG field of the segment may correspond to the channel bandwidth of the resource unit allocated to the station, and only resource indication information corresponding to the channel bandwidth indicated by the bandwidth field is carried on the segment. This helps reduce signaling overheads of PPDU transmission. In addition, resources across segments may be further allocated to the station. In comparison with a manner in which resource units of only the segment in which the station is parked are allocated to the station, this manner is more flexible in resource allocation.

In a possible implementation, the PPDU further includes an EHT-SIG field carried on the segment. The EHT-SIG field includes a resource unit allocation subfield. The bandwidth indicated by the bandwidth field corresponds to a quantity of resource unit allocation subfields included in the EHT-SIG field. The resource unit allocation subfield is used to indicate the resource unit allocated to the station parked in the segment. The bandwidth indicated by the bandwidth field of the segment corresponds to the quantity of resource unit allocation subfields included in the EHT-SIG field, so that only the resource indication information corresponding to the channel bandwidth indicated by the bandwidth field is carried on the segment. This helps reduce signaling overheads of PPDU transmission. In addition, resources across segments may be further allocated to the station. In comparison with a manner in which resource units of only the segment in which the station is parked are allocated to the station, this manner is more flexible in resource allocation.

In a possible implementation, the U-SIG field further includes a compression field. If the compression field indicates a non-compression mode, the EHT-SIG field includes the resource unit allocation subfield.

In a possible implementation, if a resource of the station parked in the segment is used for OFDMA transmission, the compression field indicates the non-compression mode. Optionally, that a resource of the station parked in the segment is used for OFDMA transmission includes two cases. In Case 1, the channel bandwidth indicated by the bandwidth field is used for OFDMA transmission. In Case 2, the channel bandwidth indicated by the bandwidth field is used for OFDMA transmission, and the resource of the station parked in the segment is used for OFDMA transmission. In this optional manner, whether to compress the EHT-SIG field may be determined at a granularity of segments. This helps reduce signaling overheads of PPDU transmission.

In a possible implementation, if the bandwidth indicated by the bandwidth field is 40 MHz, the U-SIG field and the EHT-SIG field are transmitted at the bandwidth of 40 MHz. Compared with a manner in which the U-SIG field and the EHT-SIG field are transmitted on the entire segment, this helps reduce signaling overheads of PPDU transmission.

In a possible implementation, there may be one or more of the following correspondences between the bandwidth indicated by the bandwidth field and the quantity of resource unit allocation subfields included in the EHT-SIG field. If the bandwidth indicated by the bandwidth field is 20 megahertz MHz, the quantity of resource unit allocation subfields included in the EHT-SIG field is 1. If the bandwidth indicated by the bandwidth field is 40 MHz, the quantity of resource unit allocation subfields included in the EHT-SIG field is 2. If the bandwidth indicated by the bandwidth field is 80 MHz, the quantity of resource unit allocation subfields included in the EHT-SIG field is 4. If the bandwidth indicated by the bandwidth field is 160 MHz, the quantity of resource unit allocation subfields included in the EHT-SIG field is 8. If the bandwidth indicated by the bandwidth field is 240 MHz, the quantity of resource unit allocation subfields included in the EHT-SIG field is 12. If the bandwidth indicated by the bandwidth field is 320 MHz, the quantity of resource unit allocation subfields included in the EHT-SIG field is 16. Based on this possible implementation, there may be a sufficient quantity of resource unit allocation subfields to indicate the resource in the bandwidth indicated by the bandwidth field.

In a possible implementation, the EHT-SIG field includes a preamble puncturing indication field, and the preamble puncturing indication field is used to indicate a puncturing status of the channel bandwidth indicated by the bandwidth field. A quantity of bits required by the preamble puncturing indication field is less than a quantity of bits required by the resource unit allocation subfield. Therefore, using the preamble puncturing indication field instead of the resource unit allocation subfield to indicate resource unit allocation for a station helps reduce signaling overheads of PPDU transmission.

In a possible implementation, the U-SIG field further includes a compression field. If the compression field indicates a compression mode, the EHT-SIG field includes the preamble puncturing indication field.

In a possible implementation, if a resource of the station parked in the segment is used for non-OFDMA transmission, the compression field indicates the compression mode. In this optional manner, the EHT-SIG field may be compressed at a granularity of segments. This helps reduce signaling overheads of PPDU transmission. Optionally, that a resource of the station parked in the segment is used for non-OFDMA transmission includes two cases. In Case 1, the channel bandwidth indicated by the bandwidth field is used for non-OFDMA transmission. In Case 2, the channel bandwidth indicated by the bandwidth field is used for OFDMA transmission, but the resource of the station parked in the segment is used for non-OFDMA transmission.

In a possible implementation, in both the compression mode and the non-compression mode, the EHT-SIG field may include the resource unit allocation subfield. In the compression mode, the resource unit allocation subfield is used to implement the function of the preamble puncturing indication field, that is, indicate the puncturing status of the channel bandwidth indicated by the bandwidth field. In the non-compression mode, the resource unit allocation subfield is used to indicate resource unit allocation for the station.

In a possible implementation, the U-SIG field is further used to indicate the number of EHT-SIG Symbols. The preamble puncturing indication field is further used to indicate the number of MU-MIMO users. In this possible implementation, the number of EHT-SIG Symbols can be directly notified to the station, so that the station can accurately determine the number of EHT-SIG Symbols.

In a possible implementation, the U-SIG field is further used to indicate the number of EHT-SIG Symbols. The PPDU further includes a first field carried on the segment, where the first field is used to indicate the number of multi-user multiple-input multiple-output MU-MIMO users. The first field is different from the preamble puncturing indication field. In this possible implementation, the number of EHT-SIG Symbols can be directly notified to the station, so that the station can accurately determine the number of EHT-SIG Symbols.

In a possible implementation, the PPDU further includes an EHT-SIG field carried on the segment. The U-SIG field further includes a compression field. If the transmission bandwidth of the PPDU is used for non-orthogonal frequency division multiple access OFDMA transmission, the compression field indicates a compression mode. When the compression field indicates the compression mode, the EHT-SIG field does not include a resource unit allocation subfield. The EHT-SIG field can be compressed at a granularity of the entire transmission bandwidth of the PPDU. This helps reduce signaling overheads of PPDU transmission.

In a possible implementation, if the compression field indicates the compression mode, the U-SIG field is further used to indicate the number of MU-MIMO users.

In a possible implementation, if the compression field indicates the compression mode, the EHT-SIG field includes a preamble puncturing indication field, and the preamble puncturing indication field is used to indicate a puncturing status of the transmission bandwidth of the PPDU. In this possible implementation, using the preamble puncturing indication field instead of the resource unit allocation subfield to indicate resource unit allocation for a station helps reduce signaling overheads of PPDU transmission.

In a possible implementation, EHT-SIG fields carried on the plurality of segments of the PPDU are the same. This possible implementation can improve reliability of EHT-SIG field transmission.

According to a second aspect, this application provides a bandwidth indication method applied in a wireless local area network. The method includes: A station receives a physical layer protocol data unit PPDU sent by an access point, where a transmission bandwidth of the PPDU is divided into a plurality of segments, the PPDU includes a universal signal U-SIG field carried on a segment, the U-SIG field includes a bandwidth field, and the bandwidth field indicates a channel bandwidth of a resource unit allocated to a station parked in the segment; and the station determines the channel bandwidth of the allocated resource unit based on the received U-SIG field.

For beneficial effects and possible implementations of the second aspect, refer to descriptions in the first aspect. Details are not described herein again.

According to a third aspect, a communication apparatus is provided. The apparatus may be an access point, an apparatus in an access point, or an apparatus that can be used together with an access point. The communication apparatus may be alternatively a chip system. The communication apparatus may perform the method according to the first aspect. Functions of the communication apparatus may be implemented by hardware, or may be implemented by hardware executing corresponding software. The hardware or the software includes one or more units corresponding to the foregoing functions. The units may be software and/or hardware. For operations performed by the communication apparatus and beneficial effects, refer to the method and the beneficial effects in the first aspect. To avoid repetition, details are not described herein.

According to a fourth aspect, a communication apparatus is provided. The apparatus may be a station, an apparatus in a station, or an apparatus that can be used together with a station. The communication apparatus may be alternatively a chip system. The communication apparatus may perform the method according to the second aspect. Functions of the communication apparatus may be implemented by hardware, or may be implemented by hardware executing corresponding software. The hardware or the software includes one or more units corresponding to the foregoing functions. The units may be software and/or hardware. For operations performed by the communication apparatus and beneficial effects, refer to the method and the beneficial effects in the second aspect. To avoid repetition, details are not described herein.

According to a fifth aspect, this application provides a communication apparatus, where the communication apparatus includes at least one processor. When the processor invokes a computer program in a memory, the method performed by the access point in the method according to the first aspect is performed.

According to a sixth aspect, this application provides a communication apparatus, where the communication apparatus includes at least one processor. When the processor invokes a computer program in a memory, the method performed by the station in the method according to the second aspect is performed.

According to a seventh aspect, this application provides a communication apparatus, where the communication apparatus includes a processor and a memory. The memory is configured to store a computer program. The processor is configured to execute the computer program stored in the memory, so that the communication apparatus performs the method performed by the access point in the method according to the first aspect.

According to an eighth aspect, this application provides a communication apparatus, where the communication apparatus includes a processor and a memory. The memory is configured to store a computer program. The processor is configured to execute the computer program stored in the memory, so that the communication apparatus performs the method performed by the station in the method according to the second aspect.

According to a ninth aspect, this application provides a communication apparatus, where the communication apparatus includes a processor, a memory, and a transceiver. The transceiver is configured to receive a signal or send a signal. The memory is configured to store a computer program. The processor is configured to invoke, from the memory, the computer program to perform the method performed by the access point in the method according to the first aspect.

According to a tenth aspect, this application provides a communication apparatus, where the communication apparatus includes a processor, a memory, and a transceiver. The transceiver is configured to receive a signal or send a signal. The memory is configured to store a computer program. The processor is configured to invoke, from the memory, the computer program to perform the method performed by the station in the method according to the second aspect.

According to an eleventh aspect, this application provides a communication apparatus, where the communication apparatus includes at least one processor and a communication interface. The communication interface is configured to receive a computer program and transmit the computer program to the processor. The processor runs the computer program to perform the method performed by the access point in the method according to the first aspect.

According to a twelfth aspect, this application provides a communication apparatus, where the communication apparatus includes at least one processor and a communication interface. The processor runs a computer program to perform the method performed by the station in the method according to the second aspect.

According to a thirteenth aspect, this application provides a computer-readable storage medium, where the computer-readable storage medium is configured to store instructions. When the instructions are executed, the method performed by the access point in the method according to the first aspect is implemented.

According to a fourteenth aspect, this application provides a computer-readable storage medium. The computer-readable storage medium is configured to store instructions. When the instructions are executed, the method performed by the station in the second aspect is implemented.

According to a fifteenth aspect, this application provides a computer program product including instructions. When the instructions are executed, the method performed by the access point in the method according to the first aspect is implemented.

According to a sixteenth aspect, this application provides a computer program product including instructions. When the instructions are executed, the method performed by the station in the second aspect is implemented.

BRIEF DESCRIPTION OF DRAWINGS

To describe the technical solutions in the embodiments of the present invention or in the prior art more clearly, the following briefly describes the accompanying drawings used for describing the embodiments or the prior art. It is clear that the accompanying drawings in the following descriptions show merely some embodiments of the present invention, and persons of ordinary skill in the art may derive other drawings from these accompanying drawings without creative efforts.

FIG. 3 is a schematic diagram of an HE-SIG-B field at a bandwidth of 80 MHz of a PPDU according to an embodiment of this application;

FIG. 7 is a schematic diagram of an HE-SIG-B field at a bandwidth of 20 MHz of an HE MU PPDU according to an embodiment of this application;

FIG. 8 is a schematic diagram of an HE-SIG-B field at a bandwidth of 40 MHz of an HE MU PPDU according to an embodiment of this application;

FIG. 9 is a schematic diagram of an HE-SIG-B field at a bandwidth of 160 MHz of an HE MU PPDU according to an embodiment of this application;

FIG. 21 is a schematic diagram of an EHT-SIG field 1 according to an embodiment of this application;

FIG. 22 is a schematic diagram of an EHT-SIG field 2 according to an embodiment of this application;

FIG. 23 is a schematic diagram of an EHT-SIG field 3 according to an embodiment of this application;

FIG. 24 is a schematic diagram of an EHT-SIG field 4 according to an embodiment of this application;

FIG. 27 is a schematic diagram depicting another frame structure of a PPDU according to an embodiment of this application;

DESCRIPTION OF EMBODIMENTS

Figure 1:
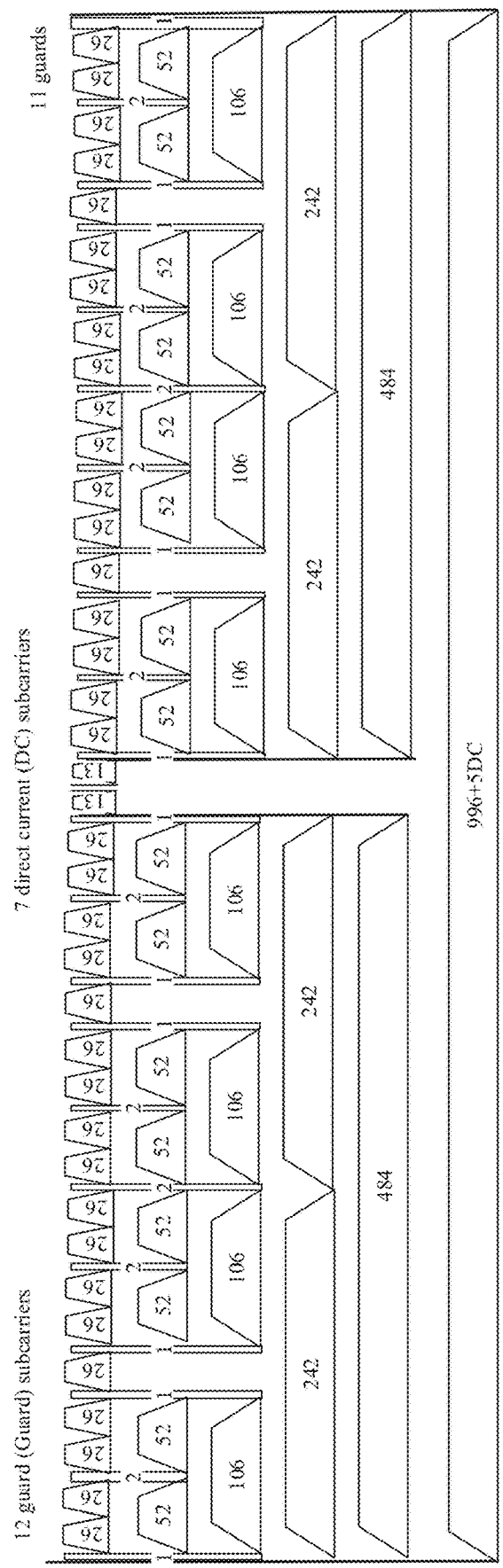
FIG. 1 is a schematic diagram of subcarrier and RU distribution at a bandwidth of 80 MHz according to an embodiment of this application.
Figure 2:
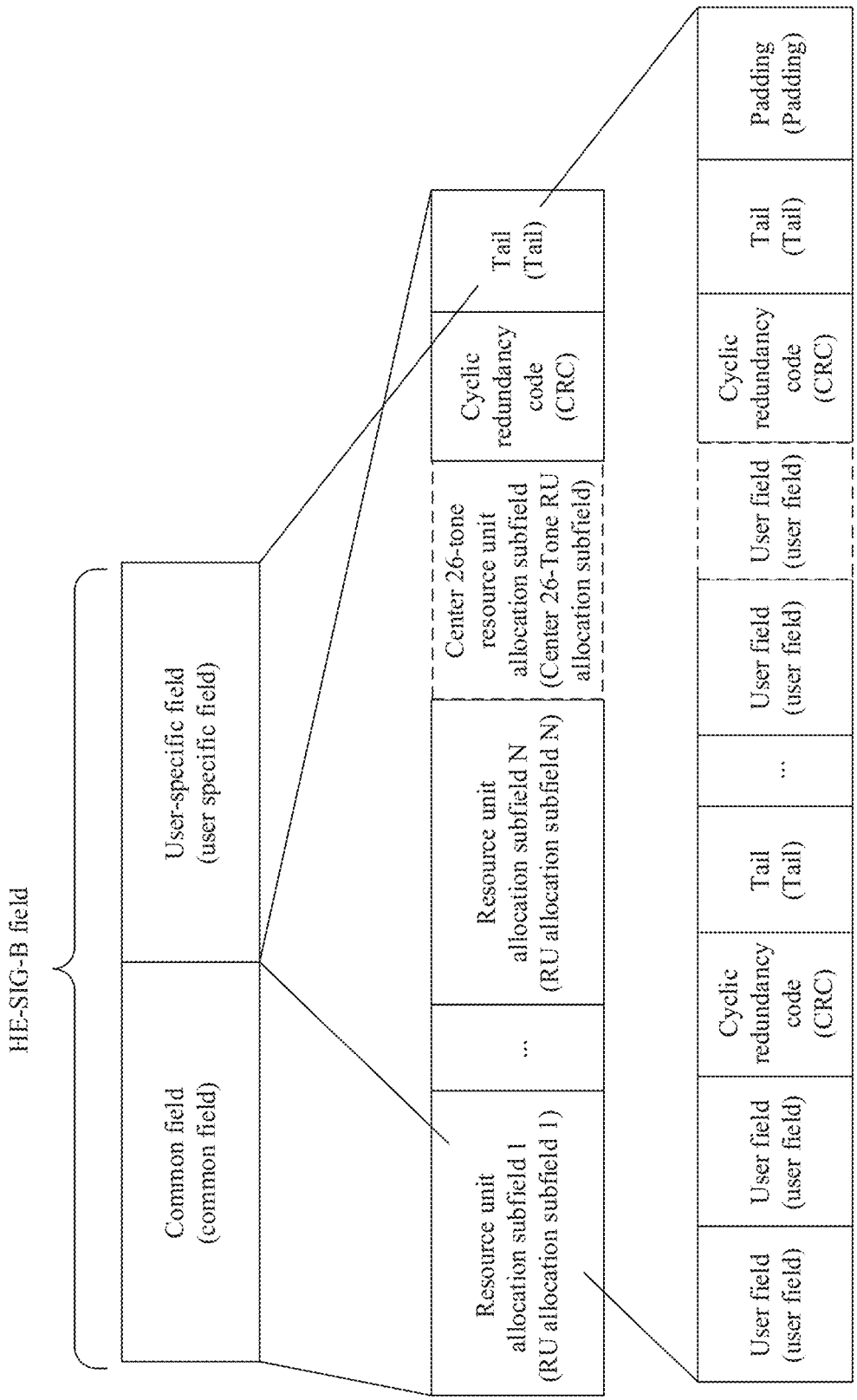
FIG. 2 is a schematic diagram depicting a coding structure of an HE-SIG-B field at a bandwidth of 20 MHz according to an embodiment of this application.

In the specification, claims, and accompanying drawings of the present invention, the terms "first", "second", "third", "fourth", and the like are intended to distinguish between different objects but do not indicate a particular order. In addition, the terms "include", "have", and any other variant thereof are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

"Embodiment" mentioned in this specification means that a particular feature, structure, or characteristic that is described with reference to the embodiment may be included in at least one embodiment of the present invention. The term described in various locations in this specification may not necessarily refer to a same embodiment, and is not an independent or optional embodiment exclusive from another embodiment. It is explicitly and implicitly understood by persons skilled in the art that the embodiments described in this specification may be combined with another embodiment.

"A plurality of" means two or more than two. "And/or" describes an association relationship between associated objects and represents that three relationships may exist. For example, A and/or B may represent the following three cases: Only A exists, both A and B exist, and only B exists. The character "/" generally indicates an "or" relationship between the associated objects.

For ease of understanding related content of the embodiments of this application, the following describes some background knowledge.

1. WLAN Bandwidth Configuration

WLAN standards have evolved over many generations, including 802.11a/b/g, 802.11n, 802.11ac, 802.11ax, and 802.11be under discussion. The 802.11n, 802.11ac, 802.11ax, and 802.11be standards are also referred to as an HT (High Throughput, high throughput) technology, a VHT (Very High Throughput, very high throughput) technology, an HE (High Efficient, high efficient) technology, and an EHT (Extremely High Throughput, extremely high throughput) technology respectively. Bandwidth configurations that can be supported by PPDUs in the foregoing WLAN standards are listed in Table 1.

TABLE 1

| 802.11a/b/g | 802.11n | 802.11ac | 802.11ax | 802.11be |
|---|---|---|---|---|
| 20 MHz | 20 MHz | 20 MHz | 20 MHz | 20 MHz |
|  | 40 MHz | 40 MHz | 40 MHz | 40 MHz |
|  |  | 80 MHz | 80 MHz | 80 MHz |
|  |  | 160 MHz/80 + 80 MHz | 160 MHz/80 + 80 MHz | 160 MHz/80 + 80 MHz |
|  |  |  |  | 240 MHz |
|  |  |  |  | 320 MHz or more |

2. Resource Unit (Resource Unit, RU)

User frequency band resources are allocated by resource units (resource unit, RU) instead of 20-MHz channels. An RU may have the following forms, for example, a 26-tone RU, a 52-tone RU, a 106-tone RU, a 242-tone RU, a 484-tone RU, and a 996-tone RU, where tone represents a subcarrier.

Figure 4:
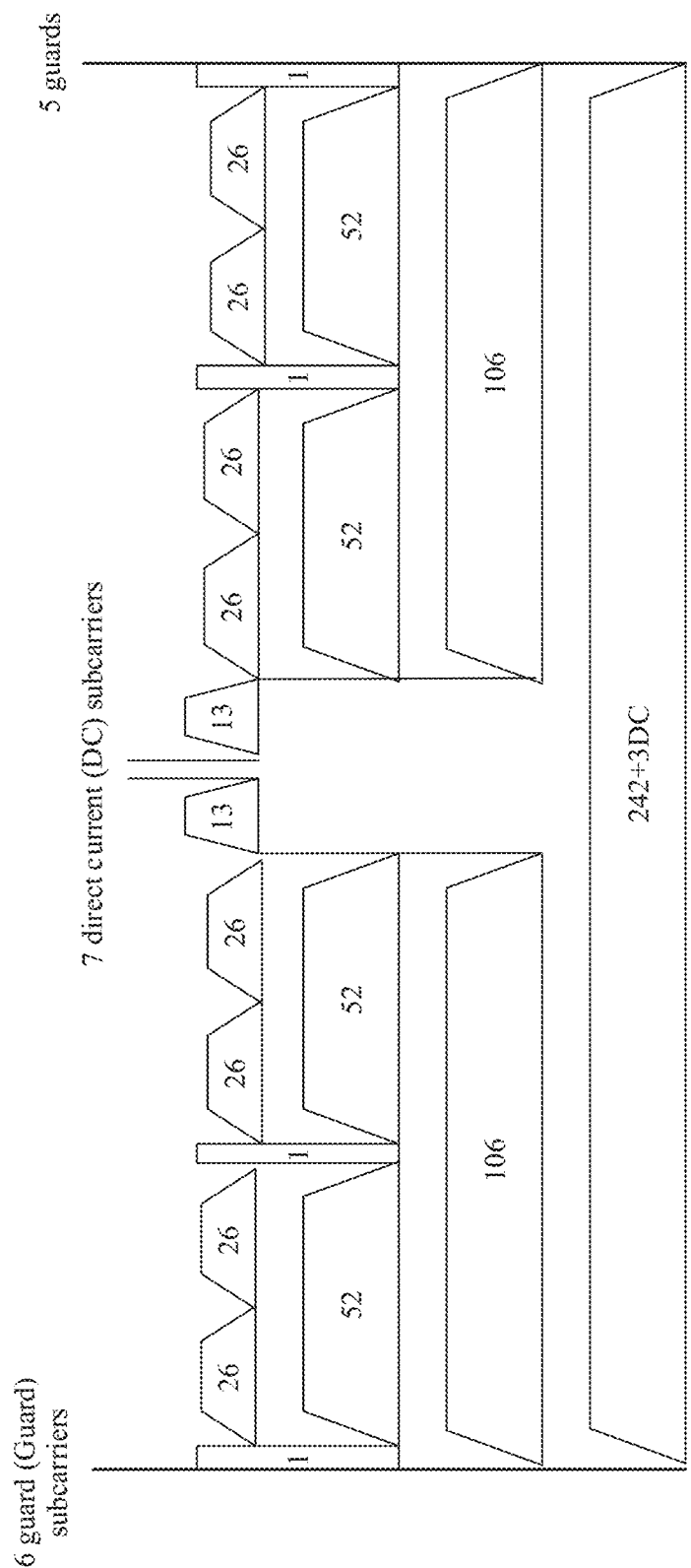
FIG. 4 is a schematic diagram of subcarrier and RU distribution at a bandwidth of 20 MHz according to an embodiment of this application.

For example, FIG. 4 is a schematic diagram of subcarrier and RU distribution at a bandwidth of 20 MHz according to an embodiment of this application. As shown in FIG. 4, the entire bandwidth of 20 MHz may include one entire 242-tone RU, or may include various combinations of 26-tone RUs, 52-tone RUs, and 106-tone RUs. In addition to the RUs for data transmission, the bandwidth further includes some guard (Guard) subcarriers, null subcarriers (a subcarrier in which 1 is located in the figure is a null subcarrier, and 1 indicates that a quantity of null subcarriers is 1), or direct current (Direct Current, DC) subcarriers.

Figure 5:
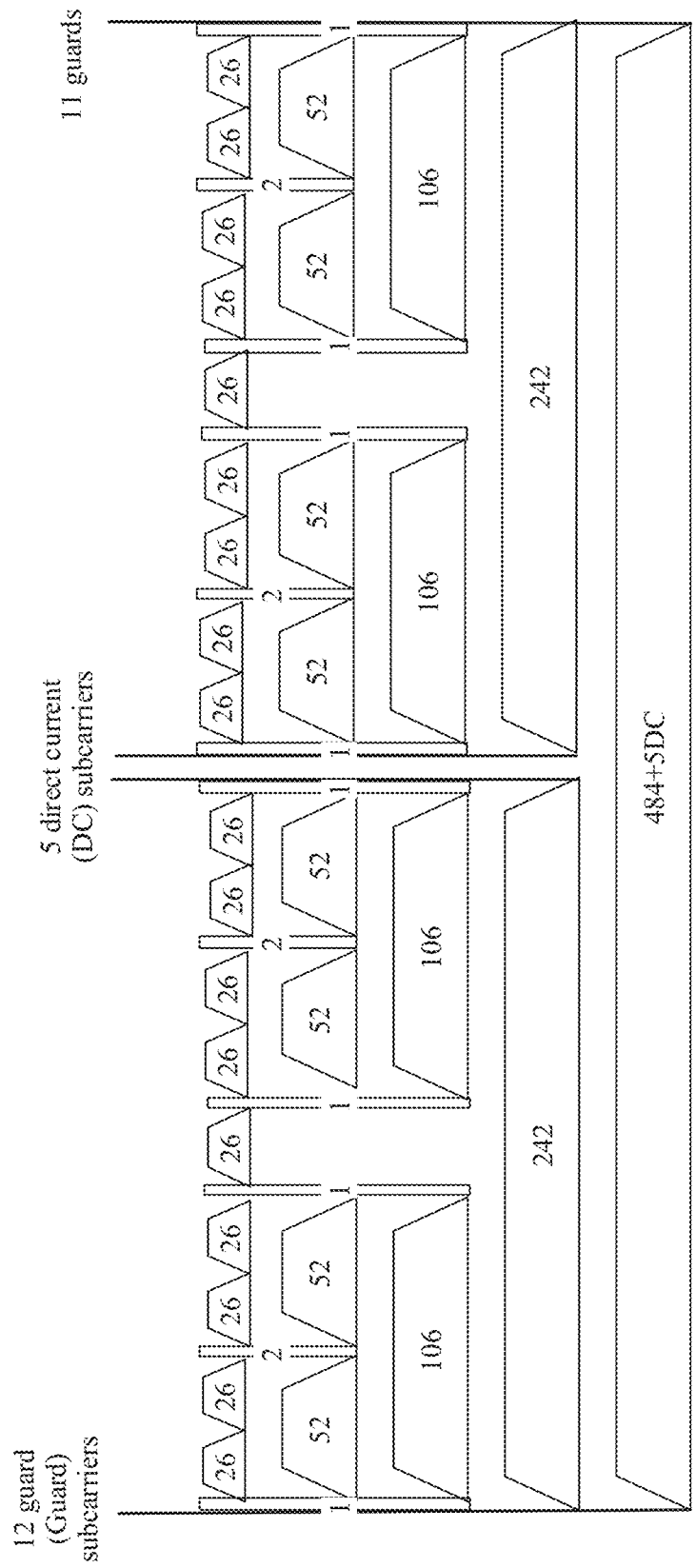
FIG. 5 is a schematic diagram of subcarrier and RU distribution at a bandwidth of 40 MHz according to an embodiment of this application.

For another example, FIG. 5 is a schematic diagram of subcarrier and RU distribution at a bandwidth of 40 MHz according to an embodiment of this application. As shown in FIG. 5, subcarrier distribution of the entire bandwidth of 40 MHz is approximately equivalent to a replication of that of 20 MHz. The entire bandwidth may include one entire 484-tone RU, or may include various combinations of 26-tone RUs, 52-tone RUs, 106-tone RUs and 242-tone RUs.

For another example, FIG. 1 is a schematic diagram of subcarrier and RU distribution at a bandwidth of 80 MHz according to an embodiment of this application. As shown in FIG. 1, the entire bandwidth of 80 MHz includes four resource units in a form of 242-tone RUs. Particularly, there is a center 26-tone RU including two 13-tone subunits in the middle of the entire bandwidth. The entire bandwidth may include one entire 996-tone RU, or may include various combinations of 26-tone RUs, 52-tone RUs, 106-tone RUs, 242-tone RUs, and 484-tone RUs.

Subcarrier distribution of an entire bandwidth of 160 MHz or 80+80 MHz may be considered as a duplicate of those of two 80 MHz. The entire bandwidth may include one entire 2*996-tone RU, or may include various combinations of 26-tone RUs, 52-tone RUs, 106-tone RUs, 242-tone RUs, 484-tone RUs, and 996-tone RUs.

3. Orthogonal Frequency Division Multiple Access (Orthogonal Frequency Division Multiple Access, OFDMA) Transmission and Non-OFDMA Transmission OFDMA transmission is a multi-user communication mechanism, and is applicable to data frame exchange between an access point (access point, AP) and a non-access point type station (none access point station, non-AP STA) in the 802.11ax standard and later standards. An entire transmission bandwidth may be divided into a plurality of RUs to be allocated to different users. In non-OFDMA transmission, an entire transmission bandwidth is used for single-user (single user, SU) or multi-user multiple-input multiple-output (multiple user multiple input multiple output, MU-MIMO) transmission. For non-OFDMA transmission, after preamble puncturing is performed, parts on which puncturing is not performed constitute a plurality of RUs, which are combined as an entirety. A combination of a plurality of RUs supported by non-OFDMA transmission is equivalent to a preamble puncturing combination supported by non-OFDMA transmission.

4. High Efficient Multiple User Physical Layer Protocol Data Unit (High Efficient Multiple User Physical Layer Protocol Data Unit, HE MU PPDU)

Figure 6:
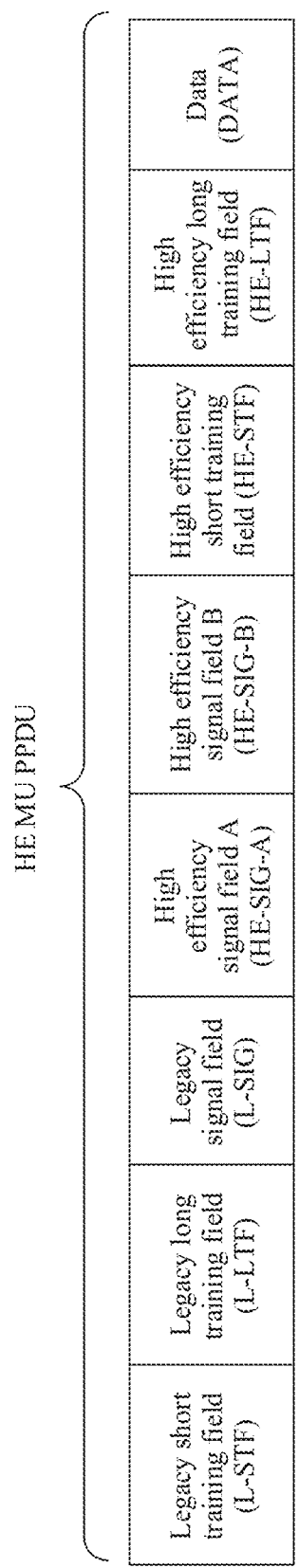
FIG. 6 is a schematic diagram depicting a frame structure of an HE MU PPDU according to an embodiment of this application.

The HE MU PPDU is mainly used for DL OFDMA and DL MU-MIMO transmission in the 802.11ax standard. FIG. 6 is a schematic diagram depicting a structure of the HE MU PPDU. As shown in FIG. 6, the HE MU PPDU is divided into a preamble part and a data field part. The preamble part includes two HE signal fields: a high efficient-signal field-A (high efficient-signal field-A, HE-SIG-A) and a high efficient-signal field-B (high efficient-signal field-B, HE-SIG-B). For related descriptions of the HE-SIG-A and the HE-SIG-B, refer to descriptions in the background.

A resource unit allocation subfield in the HE-SIG-B has eight bits. All possible resource unit arrangement and combinations in a 242-tone RU are indicated by using indexes. In addition, for an RU greater than or equal to a 106-tone RU, a quantity of users (namely, a quantity of STAs) that perform SU/MU-MIMO transmission in the RU is indicated by using indexes. Indexes of resource unit allocation subfields are shown in Table 2.

TABLE 2

| Resource unit allocation subfields (B7, B6, B5, B4, B3, B2, B1, B0) | #1 | #2 | #3 | #4 | #5 | #6 | #7 | #8 | #9 | Quantity |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | — | 106 | | | | 8 |
| 00011$y_2y_1y_0$ | 106 | | | | — | 52 | | 52 | | 8 |
| 00100$y_2y_1y_0$ | 26 | 26 | 26 | 26 | 26 | 106 | | | | 8 |
| 00101$yzy_1y_0$ | 26 | 26 | 52 | | 26 | 106 | | | | 8 |
| 00110$y_2y_1y_0$ | 52 | | 26 | 26 | 26 | 106 | | | | 8 |
| 00111$y_2y_1y_0$ | 52 | | 52 | | 26 | 106 | | | | 8 |
| 01000$y_2y_1y_0$ | 106 | | | | 26 | 26 | 26 | 26 | 26 | 8 |
| 01001$y_1y_1y_0$ | 106 | | | | 26 | 26 | 26 | 52 | | 8 |
| 01010$y_2y_1y_0$ | 106 | | | | 26 | 52 | | 26 | 26 | 8 |
| 01011$y_2y_1y_0$ | 106 | | | | 26 | 52 | | 52 | | 8 |
| 0110$y_1y_0z_1z_0$ | 106 | | | | — | 106 | | | | 16 |
| 01110000 | 52 | | 52 | | — | 52 | | 52 | | 1 |
| 01110001 | 242-tone RU null (zero users) | | | | | | | | | 1 |
| 01110010 | A resource unit allocation subfield of the HE-SIG-B content channel includes a 484-tone RU with zero user fields | | | | | | | | | 1 |
| 01110011 | A resource unit allocation subfield of the HE-SIG-B content channel includes a 996-tone RU with zero user fields | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ | 106 | | | | 26 | 106 | | | | 64 |
| 11000$y_2y_1y_0$ | 242 | | | | | | | | | 8 |
| 11001$y_2y_1y_0$ | 484 | | | | | | | | | 8 |
| 11010$y_2y_1y_0$ | 996 | | | | | | | | | 8 |
| 11011$y_2y_1y_0$ | Reserved | | | | | | | | | 8 |
| 111$x_4x_3x_2x_1x_0$ | Reserved | | | | | | | | | 32 |

As shown in Table 2, the first column represents 8-bit indexes of the resource unit allocation subfields, and the middle columns #1 to #9 represent arrangement and combination of different resource units. Each row in Table 2 represents one RU allocation. For example, the index 00111$y_2y_1y_0$ indicates that four RUs (a 52-tone RU, a 52-tone RU, a 26-tone RU, and a 106-tone RU) are allocated. In addition, the last column quantity in Table 2 is used to indicate a quantity of users included in a 106-tone RU. For example, a quantity corresponding to 00010$y_2y_1y_0$ is 8. The reason is that $y_2y_1y_0$ is further used to indicate the quantity of users included in the 106-tone RU, and corresponds to 1 to 8 users (namely, stations), in addition to indicating resource unit allocation. Each value of $y_2y_1y_0$ may be 0 or 1.

It should be noted that, a presence sequence of users in a user-specific field is consistent with a sequence of RUs obtained through division in a corresponding resource unit allocation subfield. A user may identify, by reading a station identifier in the user field, whether the user field belongs to the user. Based on a presence location of the user field and the corresponding resource unit allocation subfield, the user may learn of its own RU allocation.

In Table 2, most RU allocation is performed within a 242 tone RU, and RUs indicated by a few indexes indicate a 242-tone RU, a 484-tone RU, and a 996-tone RU.

5. Content Channel (Content Channel, CC)

In the measurement of 242-tone RUs, frequencies on the left sides of FIG. 1, FIG. 4, or FIG. 5 may be considered as lowest frequencies, and frequencies on the right sides of FIG. 1, FIG. 4, or FIG. 5 may be considered as highest frequencies. 242-tone RUs may be numbered from left to right as follows: 1#, 2#, . . . , and 8#.

The concept of content channel is introduced in the 802.11ax standard. For example, as shown in FIG. 7, when an HE MU PPDU has a bandwidth of only 20 MHz, an HE-SIG-B field includes only one content channel CC1. The CC1 includes one resource unit allocation subfield, used to indicate resource unit allocation indication within a 242-tone RU of a data part.

For another example, as shown in FIG. 8, when an HE MU PPDU has a bandwidth of 40 MHz, an HE-SIG-B field includes two content channels: a CC1 and a CC2. The CC1 includes a resource unit allocation subfield within 1# 242-tone RU and a corresponding user field. The CC2 includes a resource unit allocation subfield within a 2# 242-tone RU and a corresponding user field.

For another example, as shown in FIG. 3, at the 80-MHz bandwidth of an HE MU PPDU, an HE-SIG-B field still includes two CCs, involving four channels in total. A structure of a CC1, a CC2, a CC1 and a CC2, which are sequenced based on frequencies in ascending order, is used to indicate resource unit allocation information on the four channels. The CC1 includes resource unit allocation subfields within 1# 242-tone RU and 3# 242-tone RU, and corresponding user fields. The CC2 includes resource unit allocation subfields within 2# 242-tone RU and 4# 242-tone RU, and corresponding user fields. In addition, a center 26-tone RU indication at the 80 MHz-bandwidth is carried on each of the two CCs, to indicate whether the resource unit is used for data transmission.

For another example, as shown in FIG. 9, at a 160-MHz bandwidth of an HE MU PPDU, the HE-SIG-B field still includes two CCs, involving eight channels in total. A structure of a CC1, a CC2, a CC1, a CC2, a CC1, a CC2, a CC1, and a CC2, which are sequenced based on frequencies in ascending order, is used to indicate resource unit allocation information on the eight channels. The CC1 includes resource unit allocation subfields within 1# 242-tone RU, 3# 242-tone RU, 5# 242-tone RU, and 7# 242-tone RU, and corresponding user fields. The CC2 includes resource unit allocation subfields within 2# 242-tone RU, 4# 242-tone RU, 6# 242-tone RU, and 8# 242-tone RU, and corresponding user fields. In addition, a center 26-tone RU indication at the 80 MHz-bandwidth is carried on each of the two CCs, to indicate whether the resource unit is used for data transmission.

6. Extremely High Throughput Multiple User Physical Layer Protocol Data Unit (Extremely High Throughput Multiple User Physical Layer Protocol Data Unit, EHT MU PPDU)

Figure 10:
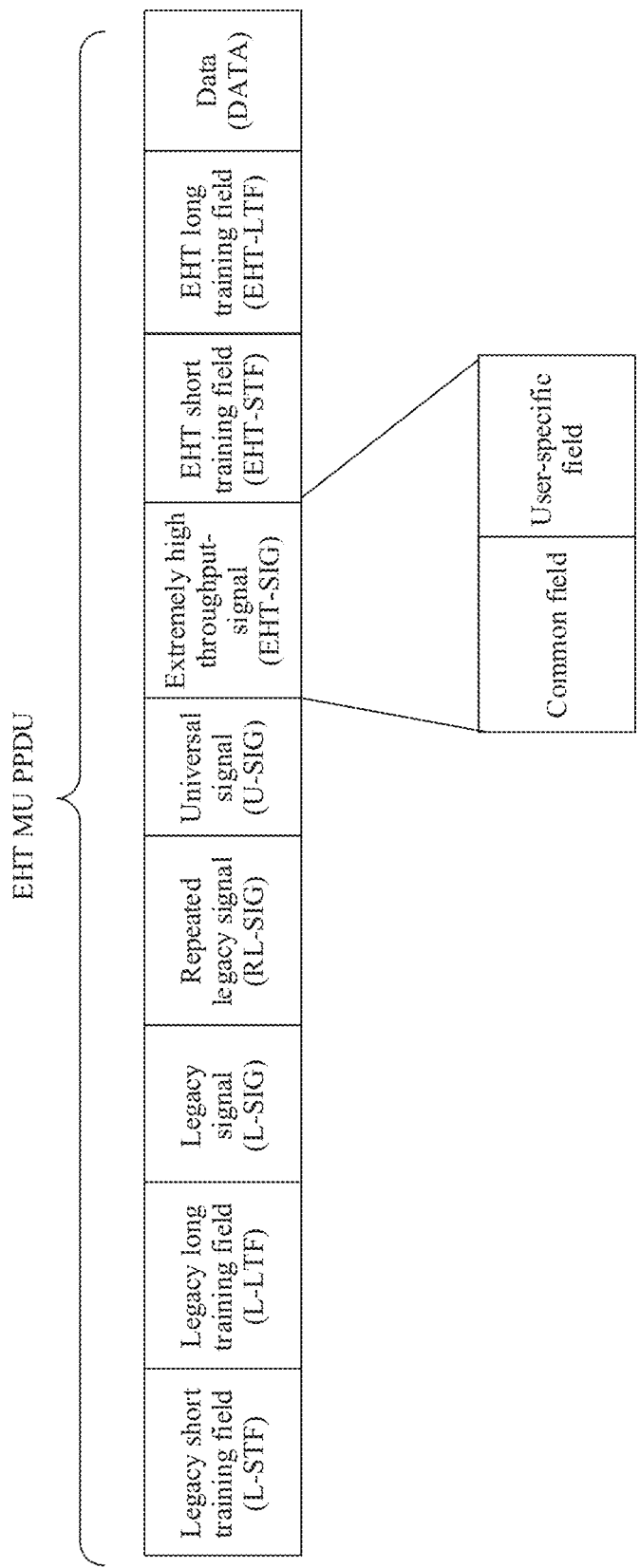
FIG. 10 is a schematic diagram depicting a frame structure of an EHT MU PPDU according to an embodiment of this application.

The EHT MU PPDU is introduced in the 802.11be standard. The EHT MU PPDU is mainly used for DL OFDMA and DL MU-MIMO transmission in the 802.11be standard. As shown in FIG. 10, an existing frame structure of the EHT MU PPDU mainly includes a legacy short training field (legacy short training, L-STF), a legacy long training field (legacy long training, L-LTF), a legacy signal (legacy signal, L-SIG) field, a repeated legacy signal (repeated legacy signal, RL-SIG) field, a universal signal (universal signal, U-SIG) field, an extremely high throughput-signal (extremely high throughput-signal, EHT-SIG) field, an EHT short training field (EHT-STF), an EHT long training field (EHT-LTF), and a data field. The EHT-SIG field may include two parts: a common field (common field) and a user-specific field. The common field includes 1 to N resource unit allocation subfields (resource unit allocation subfields). The user-specific field includes 1 to M user fields (user field) which are sequenced according to resource unit allocation.

As described above, resource unit indication at the bandwidths from 20 MHz to 160 MHz is implemented in the 802.11ax standard, but overheads of the resource unit indication are high. For example, as shown in FIG. 9, at the 160-MHz transmission bandwidth of the HE MU PPDU, each CC includes four resource unit allocation sub-indication fields and all user fields within the four 242-tone RUs, and signaling overheads of PPDU transmission are high. In the 802.11be standard or later standards, signaling overheads are further increased at a wider transmission bandwidth of the EHT MU PPDU. To reduce signaling overheads of PPDU transmission, the embodiments of this application provide a bandwidth indication method applied in a wireless local area network and a communication apparatus.

To facilitate understanding of the solutions described in the embodiments of this application, the following first describes a system architecture in the embodiments of this application.

It should be noted that the technical solutions in the embodiments of this application may be applied in a wireless local area network WLAN using the 802.11be standard or later standards, or may be applied in another communication system supporting wide-bandwidth OFDM transmission.

Figure 11:
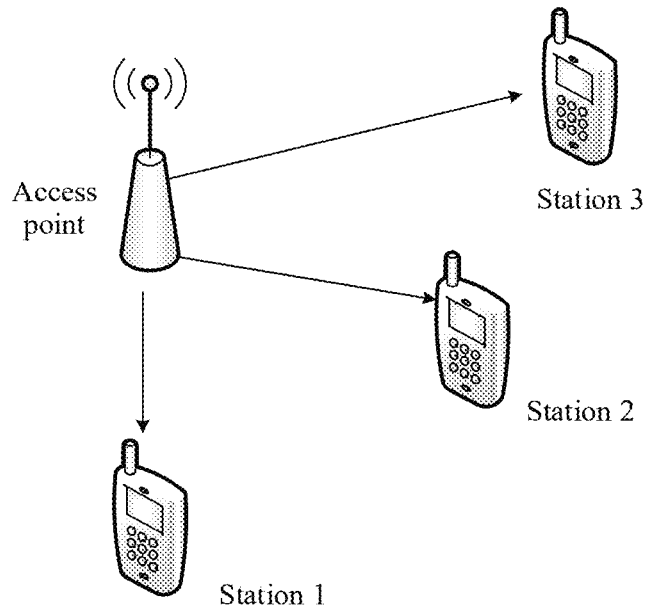
FIG. 11 is a schematic diagram of a system architecture according to an embodiment of this application.

FIG. 11 is a schematic diagram of a system architecture according to an embodiment of this application. As shown in FIG. 11, the system architecture may include an access point (access point, AP) station and a non-access point station (none access point station, non-AP STA). For ease of description, a station like an access point station is referred to as an access point (AP), and a none access point station is referred to as a station (STA). The system architecture may include one or more access points and one or more stations. For example, there are one access point and three stations in FIG. 11.

The access point may be an access point through which a terminal device (for example, a mobile phone) accesses a wired (or wireless) network. The access point is mainly deployed at a home, in a building, or inside a campus, and has a typical coverage radius of tens of meters to hundreds of meters. Certainly, the access point may alternatively be deployed outdoors. The access point, functioning as a bridge between a wired network and a wireless network, is configured to connect various wireless network clients together and then connect the wireless network to the Ethernet. Specifically, the access point may be a terminal device (for example, a mobile phone) or a network device (for example, a router) with a wireless fidelity (wireless fidelity, Wi-Fi) chip. The access point may be a device that supports the 802.11be standard. Alternatively, the access point may be a device that supports a plurality of wireless local area network (wireless local area network, WLAN) standards of the 802.11 standard family such as 802.11be, 802.11ax, 802.11ac, 802.11n, 802.11g, 802.11b, and 802.11a. The access point in this application may be a high efficient (high efficient, HE) AP or an extremely high throughput (extremely high throughput, EHT) AP, or may be an access point supporting a future Wi-Fi standard.

The station may be a wireless communication chip, a wireless sensor, a wireless communication terminal, or the like. The station may also be referred to as a user. For example, the station may be a device that supports a Wi-Fi communication function, such as a mobile phone, a tablet computer, a set-top box, a smart television, a smart wearable device, a vehicle-mounted communication device, or a computer. Optionally, the station may support the 802.11be standard. The station may also support a plurality of wireless local area network (wireless local area network, WLAN) standards of the 802.11 standard family such as 802.11be, 802.11ax, 802.11ac, 802.11n, 802.11g, 802.11b, and 802.11a.

For example, the access point and the station may be devices used in the Internet of vehicles, nodes or sensors in the Internet of Things (IoT, internet of things), smart cameras, smart remote controllers, or smart water meters in a smart home, sensors in a smart city, or the like.

The technical solutions of this application are applicable to data communication between an access point and one or more stations, between an access point and a plurality of access points, and also between a station and a plurality of stations. The following uses an example of data communication between an access point and a plurality of stations to describe the technical solutions of this application.

Figure 12:
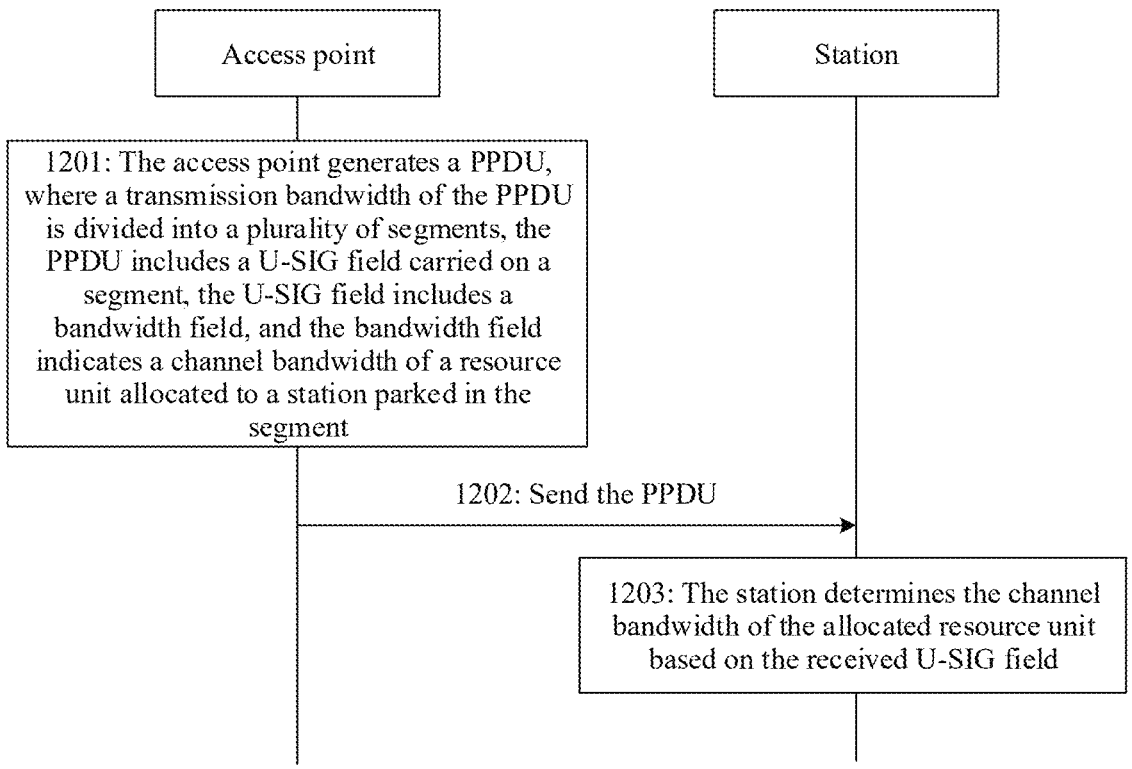
FIG. 12 is a schematic flowchart of a bandwidth indication method applied in a wireless local area network according to an embodiment of this application.

FIG. 12 is a schematic flowchart of a bandwidth indication method applied in a wireless local area network according to an embodiment of this application. As shown in FIG. 12, the bandwidth indication method applied in a wireless local area network includes the following step 1201 to step 1203. The method shown in FIG. 12 may be executed by an access point and a station. Alternatively, the method shown in FIG. 12 may be executed by a chip in an access point and a chip in a station. The example in which an access point and a station are the execution bodies is used for description in FIG. 12.

1201: The access point generates a PPDU, where a transmission bandwidth of the PPDU is divided into a plurality of segments, the PPDU includes a U-SIG field carried on a segment, the U-SIG field includes a bandwidth field, and the bandwidth field indicates a channel bandwidth of a resource unit allocated to a station parked in the segment.

In this embodiment of this application, the PPDU may be an EHT MU PPDU, or a PPDU in another 802.11 standard. This is not limited in this embodiment of this application. The transmission bandwidth of the PPDU may be 20 MHz, 40 MHz, 80 MHz, 160 MHz/80+80 MHz, 240 MHz, 320 MHz, or the like.

Names of various fields in this embodiment of this application may alternatively be termed differently. For example, the U-SIG field and the bandwidth field in the 802.11be standard may be named differently in a standard later than the 802.11be standard. "Field (field)" described in this specification may also be referred to as "domain", "information", or the like. "Subfield (subfield)" may be referred to as "sub-domain", "information", or the like.

The following first describes the two concepts: segment and channel bandwidth of a resource unit allocated to a station.

1. Segment

In this embodiment of this application, the transmission bandwidth of the PPDU is divided into a plurality of segments. A segment may be 80 MHz. Alternatively, a segment may be 20 MHz, 40 MHz, 160 MHz, or the like. One or more stations are parked in some or all of the plurality of segments.

Figure 13:
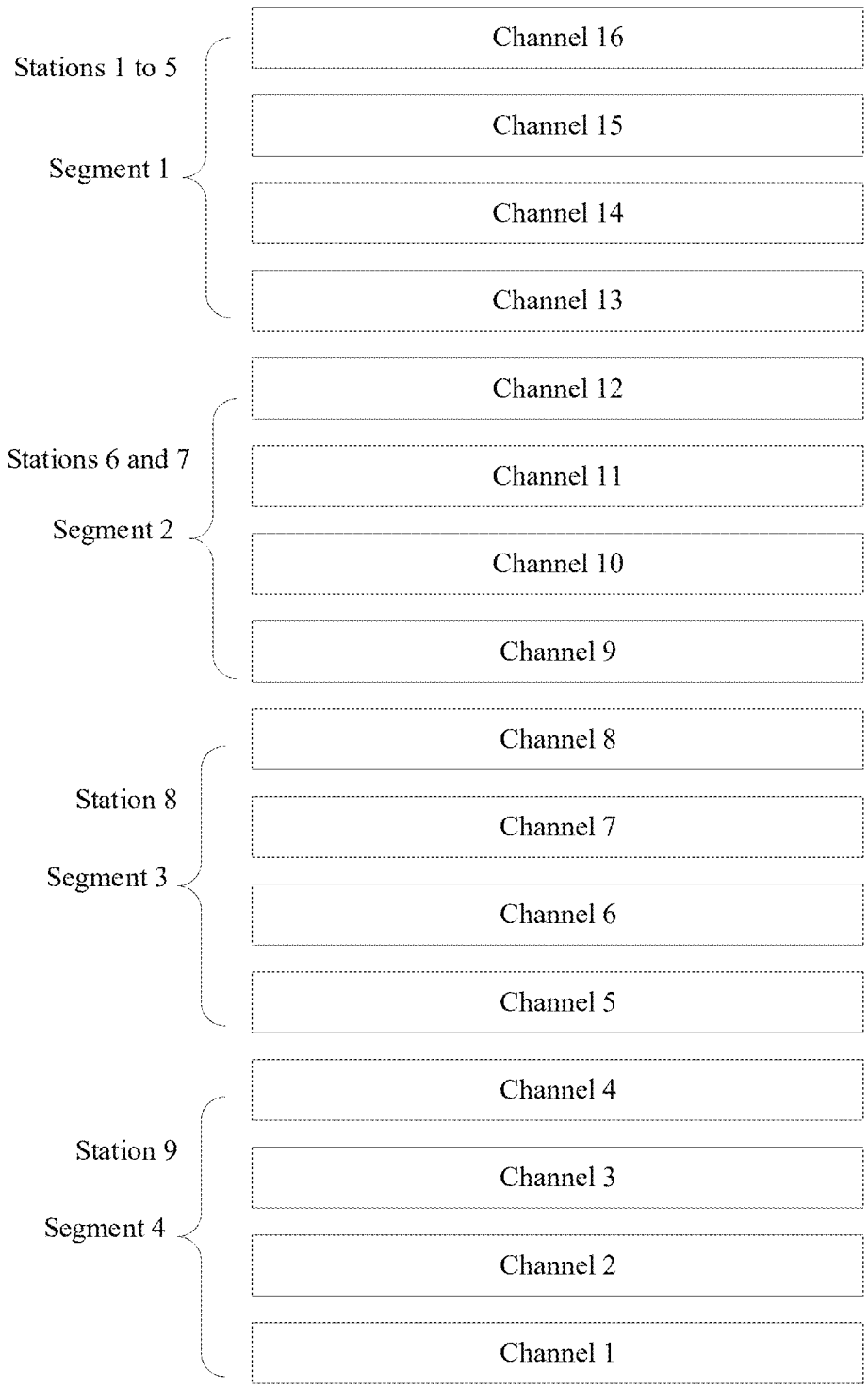
FIG. 13 is a schematic diagram of a segment according to an embodiment of this application.

For example, the transmission bandwidth of the PPDU is 320 MHz, and each segment is 80 MHz. As shown in FIG. 13, 16 channels may be included at a bandwidth of 320 MHz, and one channel is equivalent to 20 MHz. The transmission bandwidth of the PPDU is divided into a segment 1 to a segment 4, and each segment is 80 MHz. Stations 1 to 5 are parked in the segment 1, stations 6 and 7 are parked in the segment 2, a station 8 is parked in the segment 3, and a station 9 is parked in the segment 4.

Optionally, bandwidths of different segments may be different. For example, the 320-MHz transmission bandwidth of the PPDU is divided into a segment 1 to a segment 3, where the segment 1 is 80 MHz, the segment 2 is 80 MHz, and the segment 3 is 160 MHz.

2. Channel Bandwidth of a Resource Unit Allocated to a Station

Channels and channel bandwidths of stations parking in different segments may be predefined.

Figure 14:
FIG. 14 is a schematic diagram of allocation of channel bandwidths and channels of a station parked in a segment 1 according to an embodiment of this application.

For example, FIG. 14 shows allocation of channel bandwidths and channels of a station parked in a segment 1. As shown in FIG. 14, predefined channels of the station parked in the segment 1 include a primary 20-MHz (primary channel for short, Primary 20 MHz, P20) channel, a secondary 20-MHz (Secondary 20 MHz, S20) channel, a secondary 40-MHz (Secondary 40 MHz, S40) channel, a secondary 80-MHz (Secondary 80 MHz, S80) channel, and a secondary 160-MHz (Secondary 160 MHz, S40) channel. A channel 13 corresponds to the primary 20-MHz channel. A channel 14 corresponds to the secondary 20-MHz channel. A channel 15 and a channel 16 are combined into the secondary 40-MHz channel. A channel 9 to a channel 12 are combined into a secondary 80-MHz channel. A channel 1 to a channel 8 are combined into a secondary 160-MHz channel.

The predefined channel bandwidths of the station parked in the segment 1 may include one or more of the following: 20 MHz, 40 MHz, 80 MHz, 160 MHz, 240 MHz, and 320 MHz. If the transmission bandwidth of the PPDU is greater than 320 MHz, the predefined channel bandwidth may be greater than 320 MHz. For example, the predefined channel bandwidths of the station parked in the segment 1 include 80 MHz, 160 MHz, 240 MHz, and 320 MHz in FIG. 14. As shown in FIG. 14, if a resource unit allocated to the station parked in the segment 1 is in the segment 1 but not in a segment 2 to a segment 4, the channel bandwidth of the resource unit allocated to the station parked in the segment 1 is 80 MHz. If the resource unit allocated to the station parked in the segment 1 is in the segment 2 but not in a segment 3 or the segment 4, the channel bandwidth of the resource unit allocated to the station parked in the segment 1 is 160 MHz. If the resource unit allocated to the station parked in the segment 1 is in the segment 3 but not in the segment 4, the channel bandwidth of the resource unit allocated to the station parked in the segment 1 is 240 MHz. If the resource unit allocated to the station parked in the segment 1 is in the segment 4, the channel bandwidth of the resource unit allocated to the station parked in the segment 1 is 320 MHz.

Figure 15:
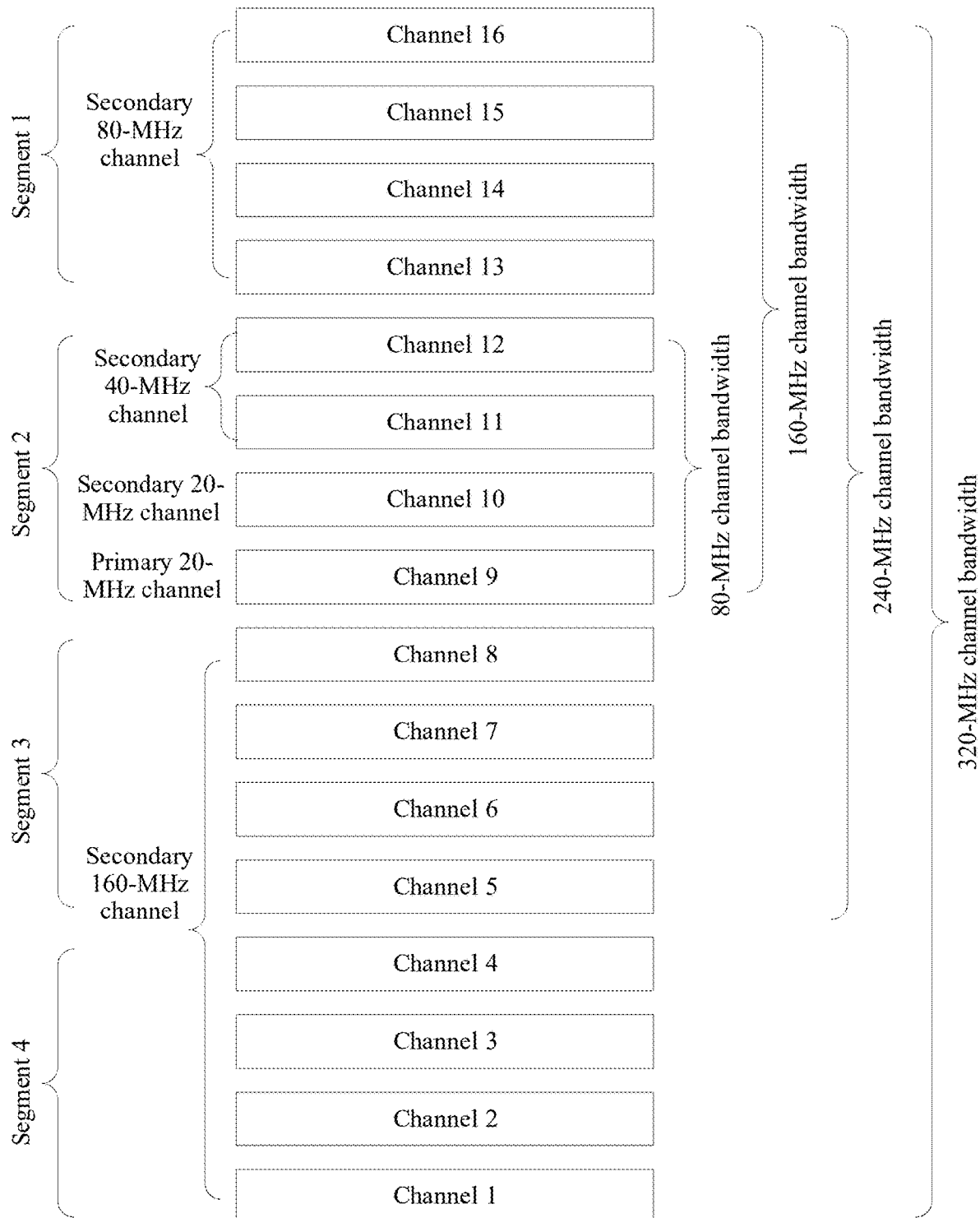
FIG. 15 is a schematic diagram of allocation of channel bandwidths and channels of a station parked in a segment 2 according to an embodiment of this application.
Figure 16:
FIG. 16 is a schematic diagram of allocation of channel bandwidths and channels of a station parked in a segment 3 according to an embodiment of this application.
Figure 17:
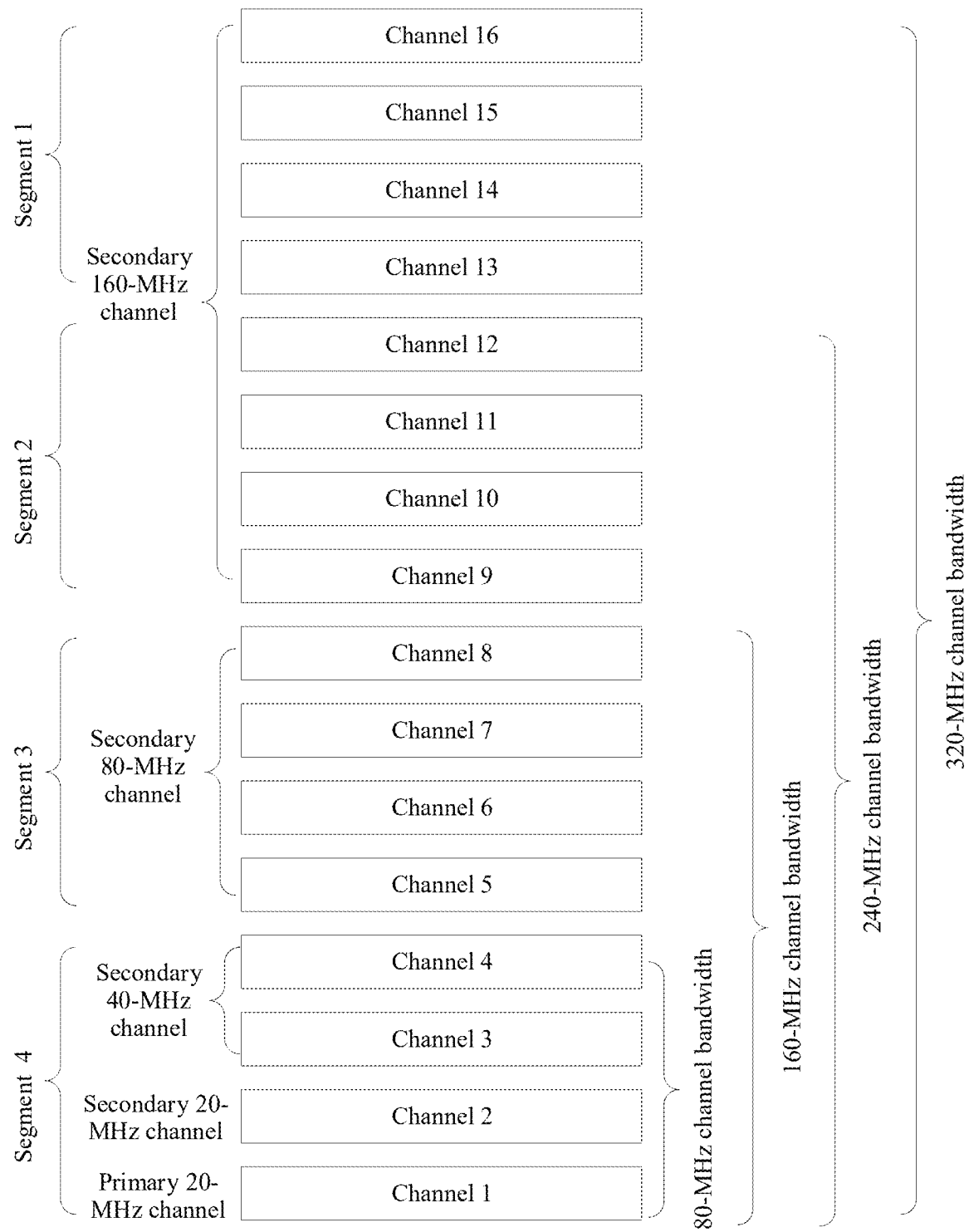
FIG. 17 is a schematic diagram of allocation of channel bandwidths and channels of a station parked in a segment 4 according to an embodiment of this application.

FIG. 15 shows allocation of channel bandwidths and channels of a station parked in the segment 2. FIG. 16 shows allocation of channel bandwidths and channels of a station parked in the segment 3. FIG. 17 shows allocation of channel bandwidths and channels of a station parked in the segment 4. A principle of determining channel bandwidths of resource units allocated to the station parked in the segment 2, the segment 3, or the segment 4 is the same as that of the segment 1. Details are not described herein again.

In the embodiments of this application, the PPDU further includes a data part of the station parked in the segment. The resource unit allocated to the station is used to carry the data part received by the station, and the station may receive data of the station in the allocated resource unit. Therefore, the channel bandwidth, indicated by the bandwidth field, of the resource unit allocated to the station parked in the segment may be equivalent to a channel bandwidth, indicated by the bandwidth field, of the data part of the station parked in the segment.

The following describes a frame structure of the PPDU in this embodiment of this application by using a specific example.

Figure 18:
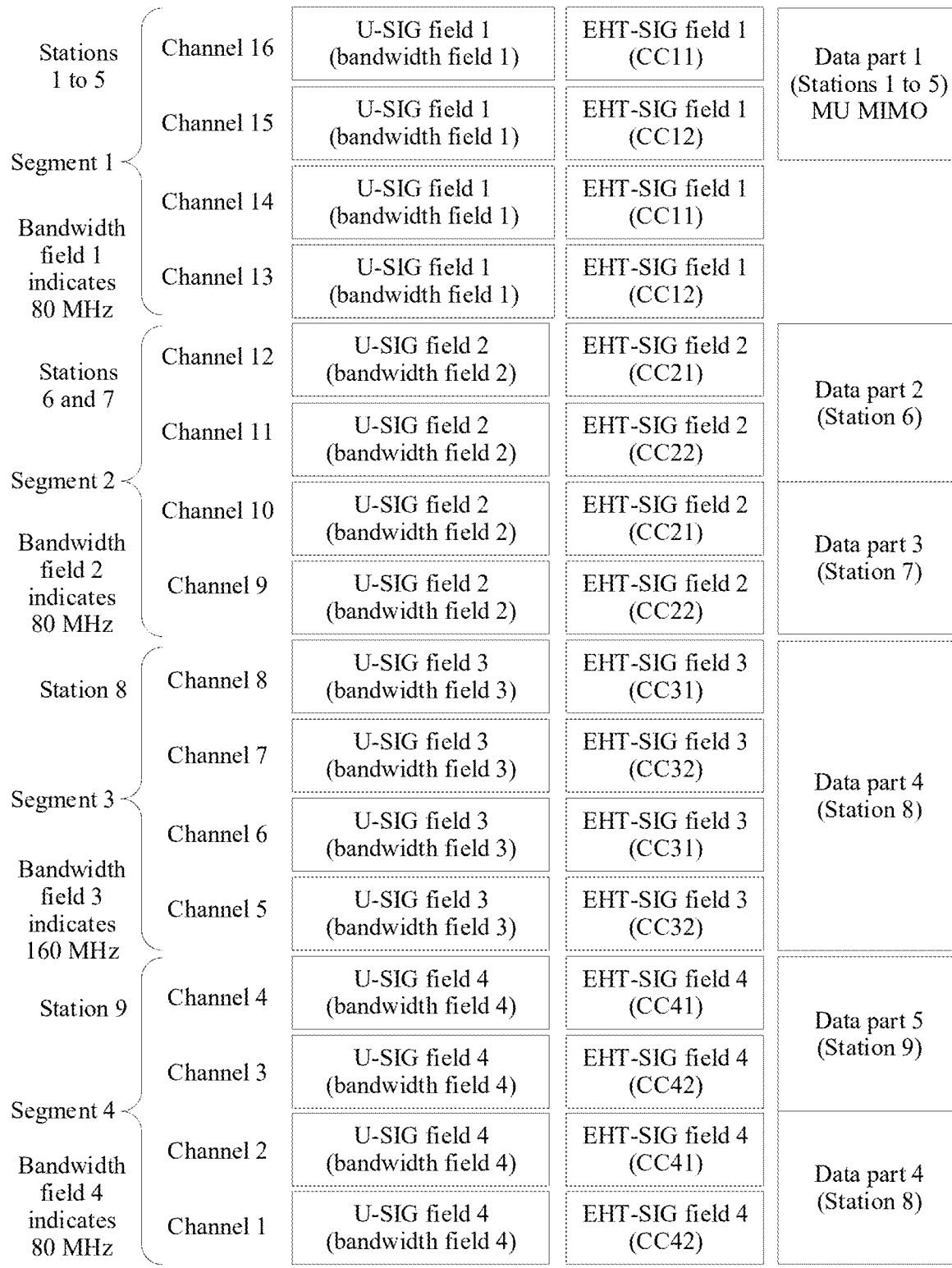
FIG. 18 is a schematic diagram depicting a frame structure of a PPDU according to an embodiment of this application.

For example, as shown in FIG. 18, the transmission bandwidth of the PPDU is 320 MHz, the transmission bandwidth of the PPDU is divided into four segments, where each of the segments has a bandwidth of 80 MHz, and includes four channels. The channel bandwidths predefined for a segment 1 to a segment 4 are shown in FIG. 14 to FIG. 17.

The PPDU includes a U-SIG field 1 carried on the segment 1, and the U-SIG field 1 includes a bandwidth field 1. The PPDU may further include an EHT-SIG field 1 carried on the segment 1, to indicate a resource unit allocated to a station parked in the segment 1. The PPDU further includes a data part 1 that is sent to stations 1 to 5. A channel bandwidth of the data part 1 is 80 MHz (to be specific, a channel bandwidth of resource units allocated to the stations 1 to 5 is 80 MHz). Therefore, a channel bandwidth indicated by the bandwidth field 1 is 80 MHz.

The PPDU further includes a U-SIG field 2 carried on the segment 2, and the U-SIG field 2 includes a bandwidth field 2. The PPDU may further include an EHT-SIG field 2 carried on the segment 2, to indicate a resource unit allocated to a station parked in the segment 2. The PPDU further includes a data part 2 that is sent to a station 6, and a data part 3 that is sent to a station 7. A channel bandwidth of the data part 2 and the data part 3 is 80 MHz (to be specific, a channel bandwidth of resource units allocated to the stations 6 and 7 is 80 MHz). Therefore, a channel bandwidth indicated by the bandwidth field 2 is 80 MHz.

The PPDU further includes a U-SIG field 3 carried on the segment 3, and the U-SIG field 3 includes a bandwidth field 3. The PPDU may further include an EHT-SIG field 3 carried on the segment 3, to indicate a resource unit allocated to a station parked in the segment 3. The PPDU further includes a data part 4 that is sent to a station 8. The data part 4 exists in both the segment 3 and the segment 4. Therefore, a channel bandwidth of the data part 4 is 160 MHz (to be specific, a channel bandwidth of a resource unit allocated to the station 8 is 160 MHz). Therefore, a channel bandwidth indicated by the bandwidth field 3 is 160 MHz.

The PPDU further includes a U-SIG field 4 carried on the segment 4, and the U-SIG field 4 includes a bandwidth field 4. The PPDU may further include an EHT-SIG field 4 carried on the segment 4, to indicate a resource unit allocated to a station parked in the segment 4. The PPDU further includes a data part 5 that is sent to a station 9. A channel bandwidth of the data part 5 is 80 MHz (to be specific, a channel bandwidth of a resource unit allocated to the station 9 is 80 MHz). Therefore, a channel bandwidth indicated by the bandwidth field 4 is 80 MHz.

In a possible implementation, the PPDU may alternatively include only U-SIG fields and EHT-SIG fields on some segments.

For example, if no resource unit is allocated to the station 9 parked in the segment 4, the PPDU may not include the U-SIG field 4 and the EHT-SIG field 4 carried on the segment 4. To be specific, the access point does not need to send the U-SIG field 4 and the EHT-SIG field 4 in the segment 4. This helps reduce signaling overheads of PPDU transmission. Certainly, the PPDU may alternatively include U-SIG fields and EHT-SIG fields on all segments.

In a possible implementation, the U-SIG field and the EHT-SIG field may be transmitted on some channels of a segment in the following three cases.

Case 1: If the channel bandwidth indicated by the bandwidth field of the segment is greater than or equal to a size of the segment, but a channel of the segment is punctured, the U-SIG field and the EHT-SIG field carried on the segment are transmitted on these channels.

Figure 19:
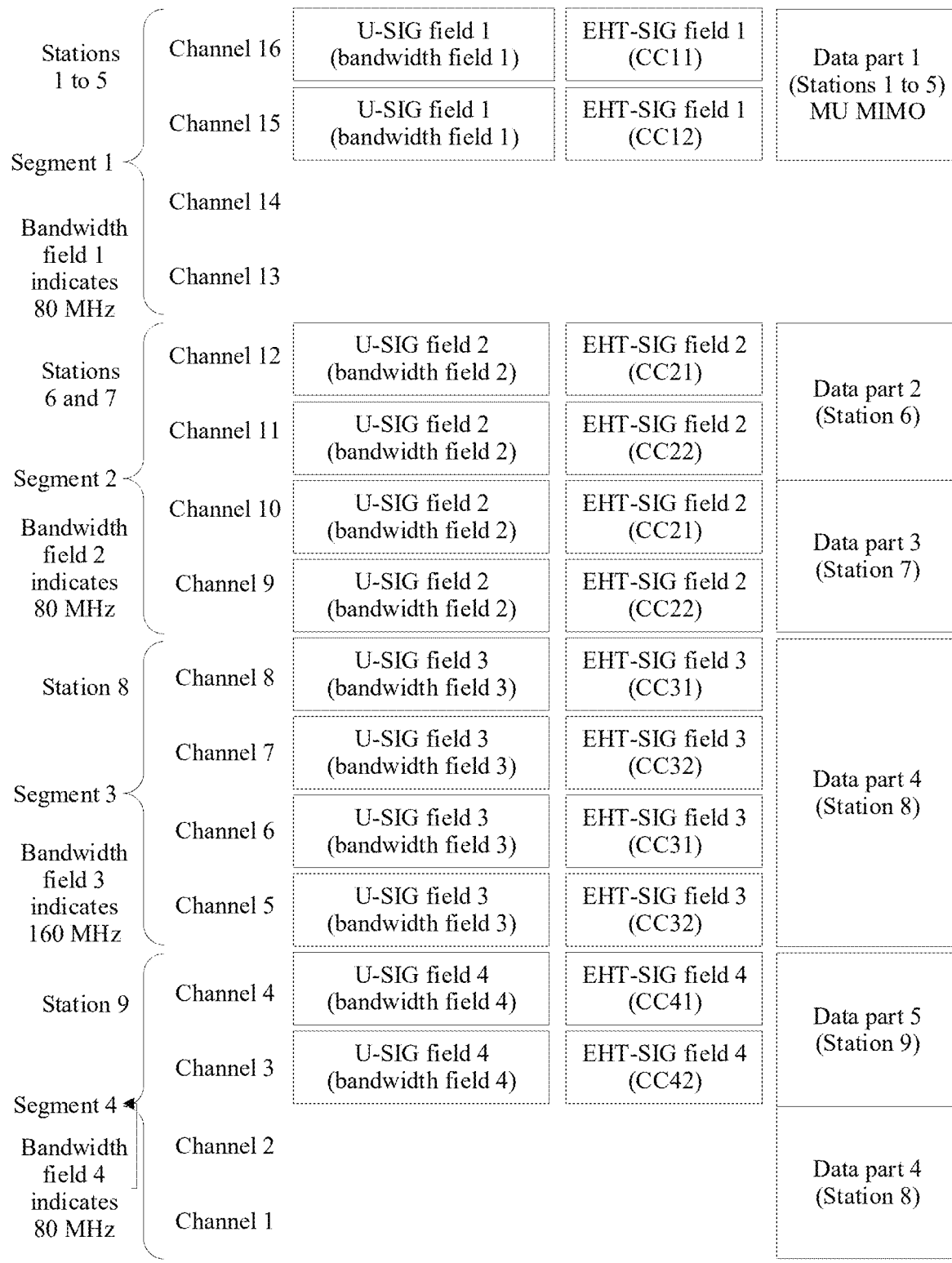
FIG. 19 is a schematic diagram depicting another frame structure of a PPDU according to an embodiment of this application.

For example, as shown in FIG. 19, although a bandwidth field 1 indicates 80 MHz, resource units allocated to stations 1 to 5 are on a channel 15 and a channel 16 of a segment 1. In other words, 40 MHz of a channel bandwidth indicated by the bandwidth field 1 is punctured. Therefore, the U-SIG field 1 may be transmitted only on the channel 15 and the channel 16 of the segment 1. Similarly, although a bandwidth field 4 indicates 80 MHz, resource units allocated to a station 9 are on a channel 3 and a channel 4 of the segment 4. In other words, 40 MHz of a channel bandwidth indicated by the bandwidth field 4 is punctured. Therefore, the U-SIG field 4 may be transmitted only on the channel 3 and the channel 4 of the segment 4. Certainly, as shown in FIG. 18, when the channel bandwidth indicated by the bandwidth field 1 is punctured, the U-SIG field 1 and the EHT-SIG field 1 may be alternatively sent on all the channels of the segment 1. When a channel bandwidth indicated by the bandwidth field 4 is punctured, the U-SIG field 4 and the EHT-SIG field 4 may be sent on all the channels of the segment 4. In this way, reliability of transmission of the U-SIG field and the EHT-SIG field can be improved.

Case 2: If the channel bandwidth indicated by the bandwidth field of the segment is 40 MHz, the U-SIG field and the EHT-SIG field carried on the segment are transmitted at the bandwidth of 40 MHz.

Figure 20:
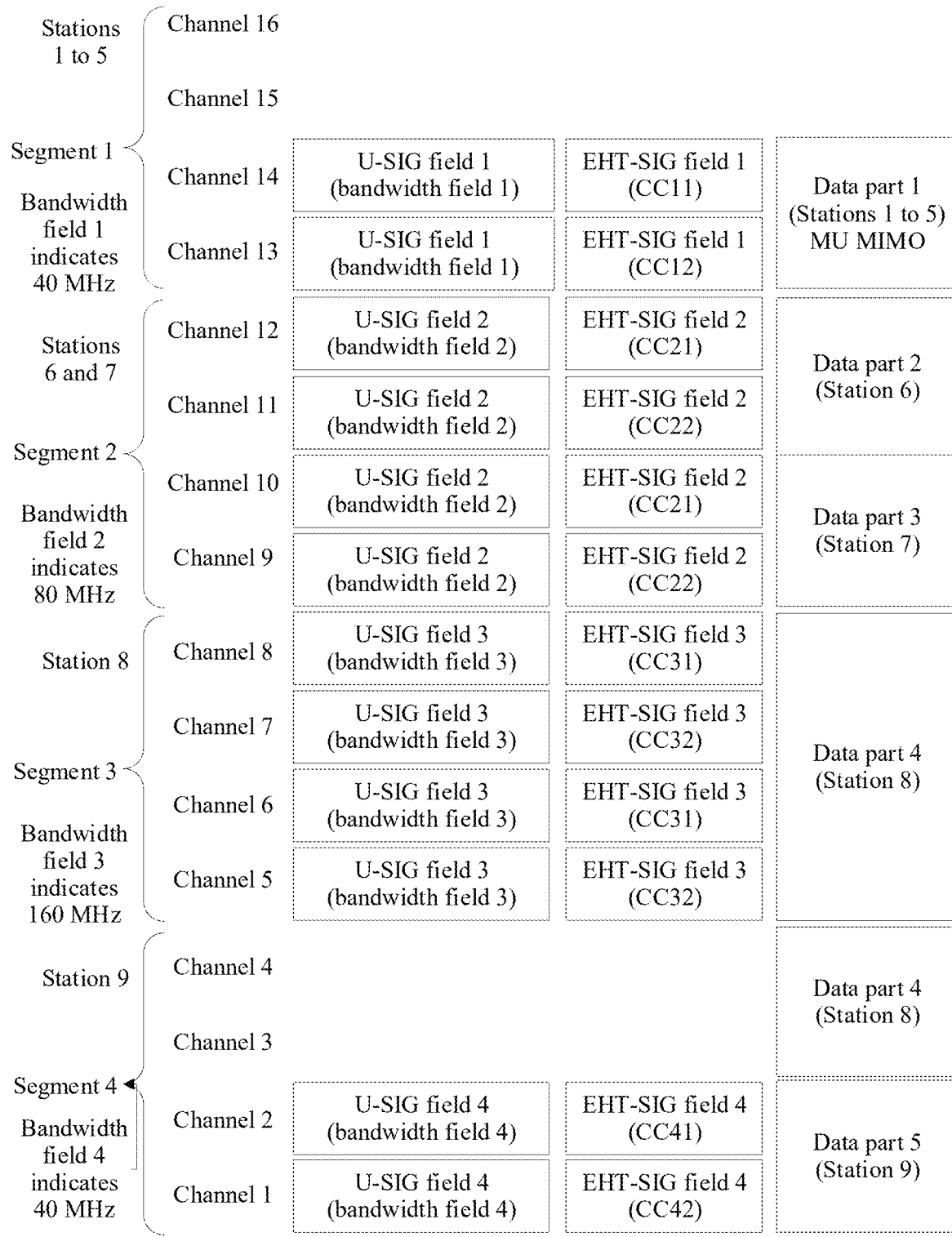
FIG. 20 is a schematic diagram depicting another frame structure of a PPDU according to an embodiment of this application.

For example, as shown in FIG. 20, a channel bandwidth indicated by a bandwidth field 1 is 40 MHz. Therefore, a U-SIG field 1 and an EHT-SIG field 1 may be transmitted only on a channel 13 and a channel 14 of a segment 1. Similarly, a channel bandwidth indicated by a bandwidth field 4 is 40 MHz. Therefore, a U-SIG field 4 and an EHT-SIG field 4 may be transmitted only on a channel 1 and a channel 2 of a segment 4. Certainly, the U-SIG field 1 and the EHT-SIG field 1 may alternatively be transmitted on all channels of the segment 1. The U-SIG field 4 and the EHT-SIG field 4 may alternatively be transmitted on all channels of the segment 4. This can improve reliability of transmission of the U-SIG field and the EHT-SIG field.

Case 3: If the channel bandwidth indicated by the bandwidth field of the segment is 20 MHz, the U-SIG field and the EHT-SIG field carried on the segment are transmitted at the bandwidth of 20 MHz. An implementation principle in Case 3 is the same as that in a case in which the channel bandwidth indicated by the bandwidth field of the segment is MHz. Details are not described herein again.

1202: The access point sends the PPDU to the station.

In this embodiment of this application, after generating the PPDU, the access point sends the PPDU to the station.

1203: The station determines the channel bandwidth of the allocated resource unit based on the received U-SIG field.

In this embodiment of this application, the station receives the PPDU on the segment in which the station parks. After receiving the U-SIG field, the station determines the channel bandwidth of the allocated resource unit based on the U-SIG field. Then, the station may determine, at the channel bandwidth, the resource unit allocated to the station; and receive, in the resource unit, a data part that is in the PPDU and that is sent to the station.

For example, in FIG. 18, the stations 1 to 5 receive the U-SIG field 1 on the segment 1, and determine, based on the U-SIG field 1, that the channel bandwidth of the resource unit allocated to the stations 1 to 5 is 80 MHz. After determining, at the 80 MHz based on the EHT-SIG field 1, the resource unit allocated to the stations 1 to 5, the stations 1 to 5 receive, on the resource unit, the data part 1 in the PPDU. Stations in other segments are similar to this, and details are not described herein again.

In the 802.11ax standard, a bandwidth field of an HE-SIG-A field transmitted on each channel is used to indicate the entire transmission bandwidth of the PPDU. For example, if the entire transmission bandwidth of the PPDU is 320 MHz, an HE-SIG-B field in the PPDU includes a CC1 and a CC2. The CC1 and the CC2 each include eight resource unit allocation subfields. The CC1 and the CC2 are separately sent on eight channels, that is, eight resource unit allocation subfields are sent on each channel. Consequently, signaling overheads of PPDU transmission are very high. By implementing the method shown in FIG. 12, all the transmission bandwidths of the PPDU may be divided into segments, and the bandwidth field of the segment may be set to be used to indicate the channel bandwidth of the resource unit allocated to the station in the segment. Therefore, a quantity of resource unit allocation subfields included in the EHT-SIG field of the segment may correspond to the channel bandwidth of the resource unit allocated to the station, and only resource indication information corresponding to the channel bandwidth indicated by the bandwidth field is carried on the segment. This helps reduce signaling overheads of PPDU transmission. In addition, resources across segments may be further allocated to the station. In comparison with a manner in which resource units of only the segment in which the station is parked are allocated to the station, this manner is more flexible in resource allocation.

The following describes possible implementations of the EHT-SIG field.

(1) The EHT-SIG field includes (or there is) a resource unit allocation subfield. The bandwidth indicated by the bandwidth field corresponds to a quantity of resource unit allocation subfields included in the EHT-SIG field. The bandwidth indicated by the bandwidth field of the segment corresponds to the quantity of resource unit allocation subfields included in the EHT-SIG field, so that only resource indication information corresponding to the channel bandwidth indicated by the bandwidth field is carried on the segment. This helps reduce signaling overheads of PPDU transmission. In addition, resources across segments may be further allocated to the station. In comparison with a manner in which resource units of only the segment in which the station is parked are allocated to the station, this manner is more flexible in resource allocation.

Optionally, there may be one or more of the following correspondences between the bandwidth indicated by the bandwidth field and the quantity of resource unit allocation subfields included in the EHT-SIG field. If the bandwidth indicated by the bandwidth field is 20 megahertz MHz, the quantity of resource unit allocation subfields included in the EHT-SIG field is 1. If the bandwidth indicated by the bandwidth field is 40 MHz, the quantity of resource unit allocation subfields included in the EHT-SIG field is 2. If the bandwidth indicated by the bandwidth field is 80 MHz, the quantity of resource unit allocation subfields included in the EHT-SIG field is 4. If the bandwidth indicated by the bandwidth field is 160 MHz, the quantity of resource unit allocation subfields included in the EHT-SIG field is 8. If the bandwidth indicated by the bandwidth field is 240 MHz, the quantity of resource unit allocation subfields included in the EHT-SIG field is 12. If the bandwidth indicated by the bandwidth field is 320 MHz, the quantity of resource unit allocation subfields included in the EHT-SIG field is 16.

The following describes the correspondence between the bandwidth indicated by the bandwidth field and the quantity of resource unit allocation subfields included in the EHT-SIG field by using specific examples.

For example, as shown in FIG. 18, the PPDU includes the U-SIG field 1 and the EHT-SIG field 1 carried on the segment 1, and the U-SIG field 1 includes the bandwidth field 1. The channel bandwidth indicated by the bandwidth field 1 is 80 MHz. Each 20-MHz bandwidth corresponds to one resource unit allocation subfield, and therefore, the EHT-SIG field 1 includes four resource unit allocation subfields. As shown in FIG. 18, the EHT-SIG field 1 may include a CC11 and a CC12. Based on a structure of a CC11, a CC12, a CC11, and a CC12, transmission is performed on the four channels of the segment 1. As shown in FIG. 21, the CC11 on the segment 1 includes a resource unit allocation subfield 1 within 1# 242-tone RU, a resource unit allocation subfield 3 within 3# 242-tone RU, and corresponding user-specific fields. The CC12 on the segment 1 includes a resource unit allocation subfield 2 within 2# 242-tone RU, a resource unit allocation subfield 4 within 4# 242-tone RU, and corresponding user-specific fields.

The PPDU further includes a U-SIG field 2 and an EHT-SIG field 2 carried on a segment 2, and the U-SIG field 2 includes a bandwidth field 2. A channel bandwidth indicated by the bandwidth field 2 is 80 MHz. Therefore, the EHT-SIG field 2 includes four resource unit allocation subfields. As shown in FIG. 18, the EHT-SIG field 2 may include a CC21 and a CC22. Based on a structure of a CC21, a CC22, a CC21, and a CC22, transmission is performed on the four channels of the segment 2. As shown in FIG. 22, the CC21 on the segment 2 includes a resource unit allocation subfield 5 within 5# 242-tone RU, a resource unit allocation subfield 7 within 7# 242-tone RU, and corresponding user-specific fields. The CC22 on the segment 2 includes a resource unit allocation subfield 6 within 6# 242-tone RU, a resource unit allocation subfield 8 within 8# 242-tone RU, and corresponding user-specific fields.

The PPDU further includes a U-SIG field 3 and an EHT-SIG field 3 carried on the segment 3, and the U-SIG field 3 includes a bandwidth field 3. A channel bandwidth indicated by the bandwidth field 3 is 160 MHz. Therefore, the EHT-SIG field 3 includes eight resource unit allocation subfields. As shown in FIG. 18, the EHT-SIG field 3 may include a CC31 and a CC32. Based on a structure of a CC31, a CC32, a CC31, and a CC32, transmission is performed on the four channels of the segment 3. As shown in FIG. 23, the CC31 on the segment 3 includes a resource unit allocation subfield 9 within 9# 242-tone RU, a resource unit allocation subfield 11 within 11# 242-tone RU, a resource unit allocation subfield 13 within 13# 242-tone RU, a resource unit allocation subfield 15 within 15# 242-tone RU, and corresponding user-specific fields. The CC32 on the segment 3 includes a resource unit allocation subfield 10 within 10# 242-tone RU, a resource unit allocation subfield 12 within 12# 242-tone RU, a resource unit allocation subfield 14 within 14# 242-tone RU, a resource unit allocation subfield 16 within 16# 242-tone RU, and corresponding user-specific fields.

The PPDU further includes a U-SIG field 4 and an EHT-SIG field 4 that are carried on the segment 4, and the U-SIG field 4 includes a bandwidth field 4. A channel bandwidth indicated by the bandwidth field 4 is 80 MHz. Therefore, the EHT-SIG field 4 includes four resource unit allocation subfields. As shown in FIG. 18, the EHT-SIG field 4 may include a CC41 and a CC42. Based on a structure of a CC41, a CC42, a CC41, and a CC42, transmission is performed on the four channels of the segment 4. As shown in FIG. 24, the CC41 on the segment 4 includes a resource unit allocation subfield 17 within 13# 242-tone RU, a resource unit allocation subfield 19 within 15# 242-tone RU, and corresponding user-specific fields. The CC42 on the segment 4 includes a resource unit allocation subfield 18 within 14# 242-tone RU, a resource unit allocation subfield 20 within 16# 242-tone RU, and corresponding user-specific fields.

It should be noted that the foregoing range of 1# 242-tone RU to 16# 242-tone RU are for the entire bandwidth of the PPDU. Alternatively, each of the foregoing CCs may not include a center 26-tone RU indication field. The resource unit allocation subfield 13 to the resource unit allocation subfield 16 may be the same as or different from the resource unit allocation subfield 17 to the resource unit allocation subfield 20.

With reference to FIG. 18 and FIG. 21 to FIG. 24, it can be learned that the CCs sent on the channel 1 to the channel 4 and the channel 9 to the channel 16 each include only two resource unit allocation subfields and corresponding user-specific fields. The CCs sent on the channels 5 to the channel 8 each include only four resource unit allocation subfields and corresponding user-specific fields. In the 802.11ax standard, when the transmission bandwidth of the PPDU is 320 MHz, CCs sent on 16 channels each include eight resource unit allocation subfields and corresponding user-specific fields. The bandwidth indicated by the bandwidth field corresponds to the quantity of resource unit allocation subfields included in the EHT-SIG field. In this way, this helps reduce a quantity of resource unit allocation subfields included in a CC sent on a channel, and reduce overheads.

In a possible implementation, the U-SIG field further includes a compression field. If the compression field indicates a non-compression mode, the EHT-SIG field includes (or there is) a resource unit allocation subfield. When the compression field indicates a compression mode, the EHT-SIG field does not include (or there is no) a resource unit allocation subfield. Alternatively, the U-SIG field may not include a compression field, and the EHT-SIG field always includes a resource unit allocation subfield.

Figure 25:
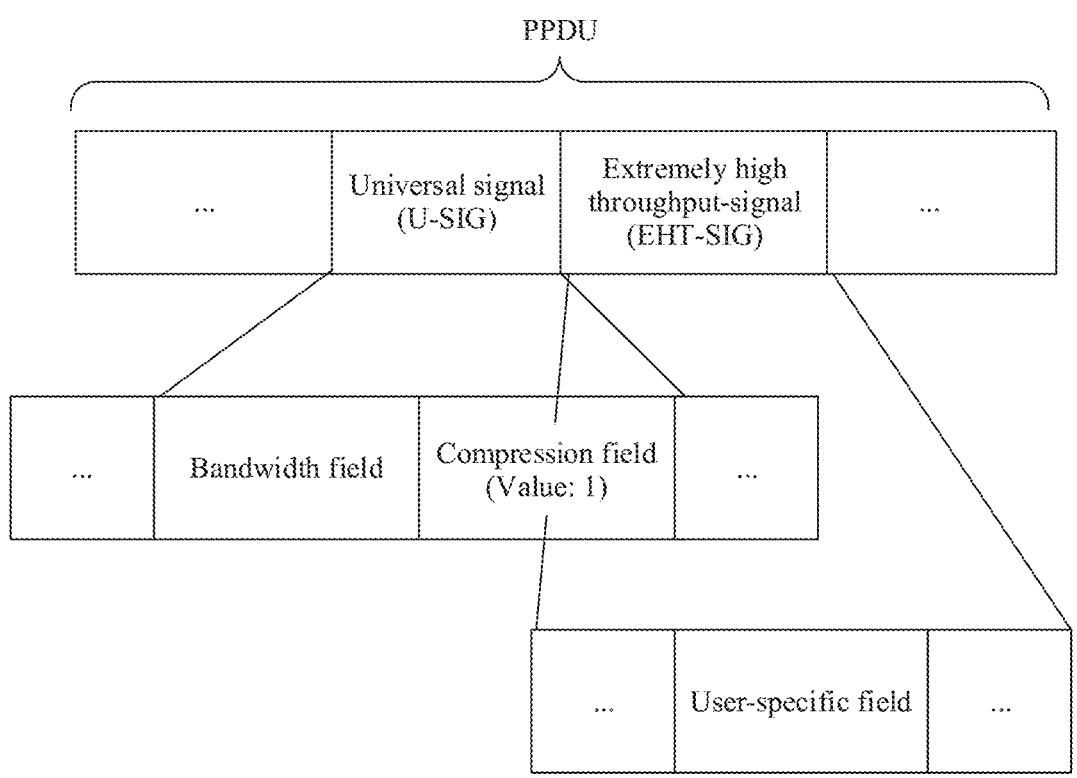
FIG. 25 is a schematic diagram depicting another frame structure of a PPDU according to an embodiment of this application.
Figure 26:
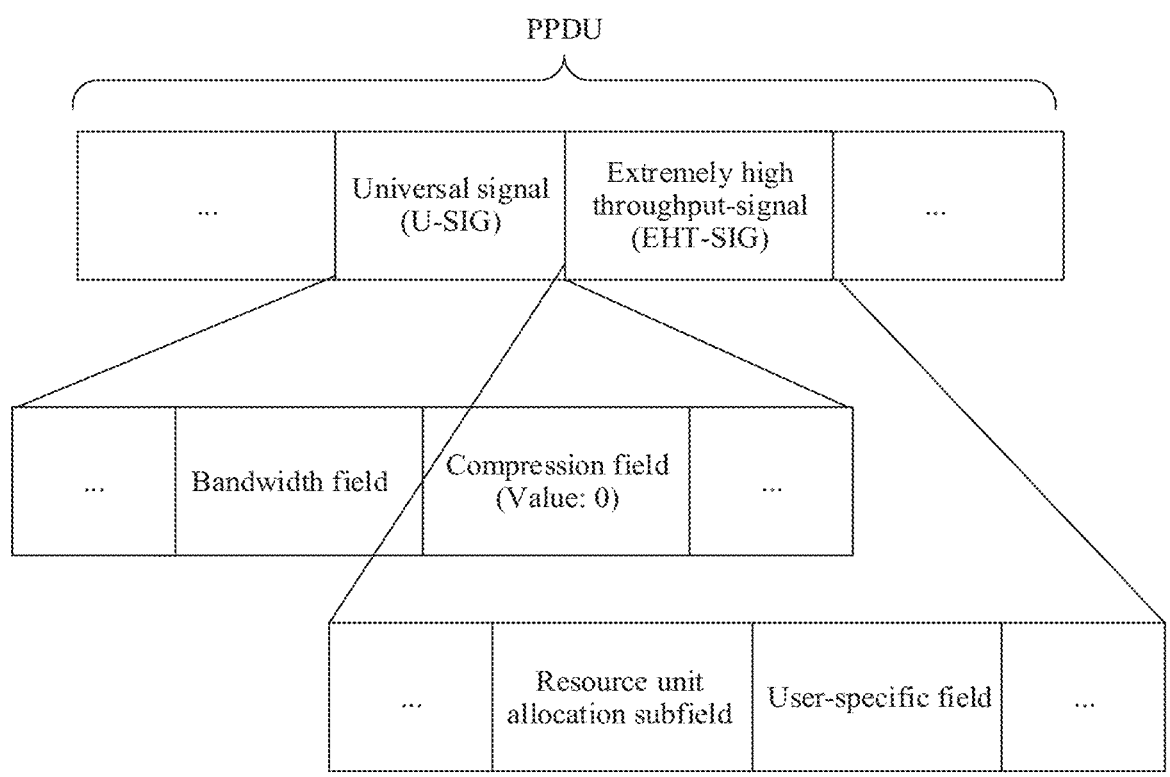
FIG. 26 is a schematic diagram depicting another frame structure of a PPDU according to an embodiment of this application.

Optionally, the compression field may include 1 bit. For example, as shown in FIG. 25, a value of the compression field is 1, indicating the compression mode. In the compression mode, the EHT-SIG field does not include the resource unit allocation subfield. As shown in FIG. 26, a value of the compression field is 0, indicating the non-compression mode. In the non-compression mode, the EHT-SIG field includes the resource unit allocation subfield. Certainly, the value of the compression field may be alternatively 1 to indicate the non-compression mode, and the value of the compression field is 0 to indicate the compression mode.

In a possible implementation, if a resource of the station parked in the segment is used for OFDMA transmission, the compression field indicates the non-compression mode. If the resource of the station parked in the segment is used for non-OFDMA transmission, the compression field indicates the compression mode. In this optional manner, whether to compress the EHT-SIG field may be determined at a granularity of segments. This helps reduce signaling overheads of PPDU transmission.

That the resource of the station parked in the segment is used for OFDMA transmission may include the following two cases.

Case 1: The channel bandwidth indicated by the bandwidth field is used for OFDMA transmission, and the resource of the station parked in the segment is used for OFDMA transmission. For example, as shown in FIG. 27, a channel bandwidth indicated by a bandwidth field 3 is used for OFDMA transmission (to be specific, channels of 160 MHz are allocated to stations 8 to 10 for OFDMA transmission), and resources of stations in a segment 3 (namely, resource units in which a data part 4 and a data part 5 are located) are used for OFDMA transmission (to be specific, the resources of the stations in the segment 3 are allocated to the stations 8 and 9 for OFDMA transmission). Therefore, a compression field in a U-SIG field 3 indicates the non-compression mode.

Case 2: The channel bandwidth indicated by the bandwidth field is used for OFDMA transmission. For example, in FIG. 27, a channel bandwidth indicated by a bandwidth field 2 is used for OFDMA transmission (to be specific, channels of 80 MHz are allocated to stations 6 and 7 for OFDMA transmission). Therefore, a compression field in a U-SIG field 2 may indicate the non-compression mode.

That the resource of the station parked in the segment is used for non-OFDMA transmission may include the following two cases.

Case 1: The channel bandwidth indicated by the bandwidth field is used for OFDMA transmission, but the resource of the station parked in the segment is used for non-OFDMA transmission. For example, as shown in FIG. 18, although the channel bandwidth indicated by the bandwidth field 3 is used for OFDMA transmission (to be specific, channels of 160 MHz are allocated to the stations 8 and 9 for OFDMA transmission), the resource of the station in the segment 3 (namely, the resource unit in which the data part 4 is located) is used for non-OFDMA transmission (to be specific, the resource of the station in the segment 3 is allocated only to the station 8 for non-OFDMA transmission). Therefore, the compression field in the U-SIG field 3 indicates the compression mode.

Case 2: The channel bandwidth indicated by the bandwidth field is used for non-OFDMA transmission. For example, in FIG. 18, the channel bandwidth indicated by the bandwidth field 1 is used for non-OFDMA transmission. Therefore, the compression field in the U-SIG field 1 may indicate the compression mode.

In a possible implementation, if the channel bandwidth indicated by the bandwidth field is used for OFDMA transmission, the compression field indicates the non-compression mode. For example, in FIG. 18, channel bandwidths indicated by the bandwidth field 2 to the bandwidth field 4 are all used for OFDMA transmission. Therefore, compression fields in the U-SIG field 2 to the U-SIG field 4 may indicate the non-compression mode.

In a possible implementation, the channel bandwidth indicated by the bandwidth field is used for non-OFDMA transmission, but the channel bandwidth indicated by the bandwidth field is punctured, and the compression field may indicate the non-compression mode. Because there may be a plurality of discrete resource units after puncturing, a resource unit allocation subfield may be used to indicate resource allocation for a station. For example, in FIG. 18, although the channel bandwidth indicated by the bandwidth field 1 is used for non-OFDMA transmission, the channel bandwidth indicated by the bandwidth field 1 is punctured. Therefore, a compression field in a U-SIG field 1 may indicate the non-compression mode.

(2) The EHT-SIG field includes a preamble puncturing indication field. The preamble puncturing indication field is used to indicate a puncturing status of the channel bandwidth indicated by the bandwidth field or indicate a puncturing status of the transmission bandwidth of the PPDU. The term "preamble puncturing indication field" may alternatively be named differently, for example, channel puncturing field or puncturing field.

In this implementation, when a compression field indicates a compression mode, the EHT-SIG field may include the preamble puncturing indication field. For when the compression field indicates the compression mode, refer to the foregoing description. Details are not described herein again. Alternatively, the U-SIG field may not include the compression field, and the EHT-SIG field always includes the preamble puncturing indication field. A quantity of bits required by the preamble puncturing indication field is less than a quantity of bits required by the resource unit allocation subfield. Therefore, using the preamble puncturing indication field instead of the resource unit allocation subfield to indicate resource unit allocation for a station helps reduce signaling overheads of PPDU transmission.

Optionally, the preamble puncturing indication field may be presented at a location the same as a start point of the resource unit allocation subfield.

The preamble puncturing indication field may indicate a puncturing status by carrying an index. A mapping relationship between an index and a puncturing pattern may be predefined. For example, the mapping relationship between an index and a puncturing pattern may be shown in the following Table 3. When an index carried in the preamble puncturing indication field is 0, it indicates that a puncturing pattern is 1X11. When an index carried in the preamble puncturing indication field is 1, it indicates that a puncturing pattern is 1X11. A case in which the preamble puncturing indication field carries another index is similar. Details are not described herein again. Each bit of the puncturing pattern represents 20 MHz. X indicates a puncturing location. For example, if the puncturing pattern is 1X11, it indicates that a first 20 MHz in 80 MHz is punctured. An RU size column in Table 3 indicates a size of an RU obtained through puncturing. For example, "484+242" indicates that a 484-tone RU and a 242-tone RU are combined. "–+996+996" indicates that two 996-tone RUs are combined, where "–" indicates empty. The RU size column is optional in Table 3. It should be noted that the mapping relationship shown in Table 3 may be used to indicate a puncturing status of the transmission bandwidth of the PPDU or a puncturing status of the channel bandwidth indicated by the bandwidth field.

Table 4 lists other mapping relationships between indexes and puncturing patterns according to an embodiment of this application. The mapping relationships shown in Table 4 may be used to indicate a puncturing status of channel bandwidths indicated by bandwidth fields. For example, if the channel bandwidth indicated by the bandwidth field is 80 MHz, a mapping relationship corresponding to 80 MHz in Table 4 may be used to indicate a puncturing status of the channel bandwidth. If the channel bandwidth indicated by the bandwidth field is 160 MHz, a mapping relationship corresponding to 160 MHz in Table 4 may be used to indicate a puncturing status of the channel bandwidth. If the channel bandwidth indicated by the bandwidth field is 240 MHz, a mapping relationship corresponding to 240 MHz in Table 4 may be used to indicate a puncturing status of the channel bandwidth. If the channel bandwidth indicated by the bandwidth field is 320 MHz, a mapping relationship corresponding to 320 MHz in Table 4 may be used to indicate a puncturing status of the channel bandwidth. It should be noted that Table 4 may be alternatively split into four tables, and each of the tables represents a puncturing status corresponding to one of the bandwidths.

TABLE 3

| Index | RU size | Puncturing pattern |
| --- | --- | --- |
| 0 | 484 + 242 | X111 |
| 1 | 484 + 242 | 1X11 |
| 2 | 484 + 242 | 11X1 |
| 3 | 484 + 242 | 111X |
| 4 | 484 + 996 | XX11 1111 |
| 5 | 484 + 996 | 11XX 1111 |
| 6 | 484 + 996 | 1111 XX11 |
| 7 | 484 + 996 | 1111 11XX |
| 8 | 484 + 242 + 996 | X111 1111 |
| 9 | 484 + 242 + 996 | 1X11 1111 |
| 10 | 484 + 242 + 996 | 11X1 1111 |
| 11 | 484 + 242 + 996 | 111X 1111 |
| 12 | 484 + 242 + 996 | 1111 X111 |
| 13 | 484 + 242 + 996 | 1111 1X11 |
| 14 | 484 + 242 + 996 | 1111 11X1 |
| 15 | 484 + 242 + 996 | 1111 111X |
| 16 | 484 + 996 + 996 | XX11 1111 1111 |
| 17 | 484 + 996 + 996 | 11XX 1111 1111 |
| 18 | 484 + 996 + 996 | 1111 XX11 1111 |
| 19 | 484 + 996 + 996 | 1111 11XX 1111 |
| 20 | 484 + 996 + 996 | 1111 1111 XX11 |
| 21 | 484 + 996 + 996 | 1111 1111 11XX |
| 22 | — + 996 + 996 | XXXX 1111 1111 |
| 23 | — + 996 + 996 | 1111 XXXX 1111 |
| 24 | — + 996 + 996 | XXXX 1111 1111 |
| 25 | 484 + 996 + 996 + 996 | XX11 1111 1111 1111 |
| 26 | 484 + 996 + 996 + 996 | 11XX 1111 1111 1111 |
| 27 | 484 + 996 + 996 + 996 | 1111 XX11 1111 1111 |
| 28 | 484 + 996 + 996 + 996 | 1111 11XX 1111 1111 |
| 29 | 484 + 996 + 996 + 996 | 1111 1111 XX11 1111 |
| 30 | 484 + 996 + 996 + 996 | 1111 1111 11XX 1111 |
| 31 | 484 + 996 + 996 + 996 | 1111 1111 1111 XX11 |
| 32 | 484 + 996 + 996 + 996 | 1111 1111 1111 11XX |
| 33 | — + 996 + 996 + 996 | XXXX 1111 1111 1111 |
| 34 | — + 996 + 996 + 996 | 1111 XXXX 1111 1111 |
| 35 | — + 996 + 996 + 996 | XXXX 1111 1111 1111 |
| 36 | — + 996 + 996 + 996 | 1111 1111 1111 XXXX |
| 37 | No puncturing | |

TABLE 4

| Bandwidth | Index | RU size | Specific mode |
| --- | --- | --- | --- |
| 80 MHz | 0 | 484 + 242 | X111 |
| | 1 | 484 + 242 | 1X11 |
| | 2 | 484 + 242 | 11X1 |
| | 3 | 484 + 242 | 111X |
| | 4-30 | Reserved | |
| | 31 | No puncturing | 1111 |
| 160 MHz | 0 | 484 + 996 | XX11 1111 |
| | 1 | 484 + 996 | 11XX 1111 |
| | 2 | 484 + 996 | 1111 XX11 |
| | 3 | 484 + 996 | 1111 11XX |
| | 4-30 | Reserved | |
| | 31 | No puncturing | 1111 1111 |
| 240 MHz | 0 | 484 + 242 + 996 | X111 1111 |
| | 1 | 484 + 242 + 996 | 1X11 1111 |
| | 2 | 484 + 242 + 996 | 11X1 1111 |
| | 3 | 484 + 242 + 996 | 111X 1111 |
| | 4 | 484 + 242 + 996 | 1111 X111 |
| | 5 | 484 + 242 + 996 | 1111 1X11 |
| | 6 | 484 + 242 + 996 | 1111 11X1 |
| | 7 | 484 + 242 + 996 | 1111 111X |
| | 8 | 484 + 996 + 996 | XX11 1111 1111 |
| | 9 | 484 + 996 + 996 | 11XX 1111 1111 |
| | 10 | 484 + 996 + 996 | 1111 XX11 1111 |
| | 11 | 484 + 996 + 996 | 1111 11XX 1111 |
| | 12 | 484 + 996 + 996 | 1111 1111 XX11 |
| | 13 | 484 + 996 + 996 | 1111 1111 11XX |
| | 14 | — + 996 + 996 | XXXX 1111 1111 |
| | 15 | — + 996 + 996 | 1111 XXXX 1111 |
| | 16 | — + 996 + 996 | XXXX 1111 1111 |
| | 17-30 | Reserved | |
| | 31 | No puncturing | 1111 1111 1111 |
| 320 MHz | 1 | 484 + 996 + 996 + 996 | XX11 1111 1111 1111 |
| | 2 | 484 + 996 + 996 + 996 | 11XX1111 1111 1111 |
| | 3 | 484 + 996 + 996 + 996 | 1111 XX11 1111 1111 |
| | 4 | 484 + 996 + 996 + 996 | 1111 11XX 1111 1111 |
| | 5 | 484 + 996 + 996 + 996 | 1111 1111 XX11 1111 |
| | 6 | 484 + 996 + 996 + 996 | 1111 1111 11XX 1111 |
| | 7 | 484 + 996 + 996 + 996 | 1111 1111 1111 XX11 |
| | 8 | 484 + 996 + 996 + 996 | 1111 1111 1111 11XX |
| | 9 | — + 996 + 996 + 996 | XXXX 1111 1111 1111 |
| | 10 | — + 996 + 996 + 996 | 1111 XXXX 1111 1111 |
| | 11 | — + 996 + 996 + 996 | XXXX 1111 1111 1111 |
| | 12 | — + 996 + 996 + 996 | 1111 1111 1111 XXXX |
| | 13-30 | Reserved | |
| | 31 | No puncturing | 1111 1111 1111 1111 |

In a possible implementation, in both the compression mode and the non-compression mode, the EHT-SIG field may include the resource unit allocation subfield. In the compression mode, the resource unit allocation subfield is used to implement the function of the preamble puncturing indication field, that is, indicate the puncturing status of the channel bandwidth indicated by the bandwidth field. In the non-compression mode, the resource unit allocation subfield is used to indicate resource unit allocation for the station.

In a possible implementation, the U-SIG field is further used to indicate the number of EHT-SIG Symbols, and the preamble puncturing indication field is further used to indicate the number of MU-MIMO users. In other words, the PPDU indicates both the number of EHT-SIG Symbols and the quantity the MU-MIMO users. In this possible implementation, the number of EHT-SIG Symbols can be directly notified to the station, so that the station can accurately determine the number of EHT-SIG Symbols.

For example, as listed in the following Table 5, a mapping relationship between an index, a puncturing pattern, and number of MU-MIMO Users may be predefined. When an index carried in the preamble puncturing indication field is 0, it indicates that a puncturing pattern is X111 and number of MU-MIMO Users is 1. When an index carried in the preamble puncturing indication field is 1, it indicates that a puncturing mode is X111 and the number Of MU-MIMO Users is 2. A case in which the preamble puncturing indication field carries another index is similar. Details are not described herein again. It should be noted that quantities of MU-MIMO users corresponding to index numbers 16 to 31 are 1, 2, 3, . . . , and 16 in ascending order in Table 5. Similarly, quantities of MU-MIMO users corresponding to index numbers 32 to 47 are 1, 2, 3, . . . , and 16 in ascending order respectively. Quantities of users corresponding to indexes after 32 to 47 are similar, and details are not described herein.

TABLE 5

| Index | RU size | Specific mode | Number of MU-MIMO users |
|---|---|---|---|
| 0 | 484 + 242 | X111 | 1 |
| 1 | 484 + 242 | X111 | 2 |
| 2 | 484 + 242 | X111 | 3 |
| 3 | 484 + 242 | X111 | 4 |
| 4 | 484 + 242 | X111 | 5 |
| 5 | 484 + 242 | X111 | 6 |
| ... | ... | ... | |
| 15 | 484 + 242 | X111 | 16 |
| 16-31 | 484 + 242 | 1X11 | 1-16 |
| 32-47 | 484 + 242 | 11X1 | 1-16 |
| 48-63 | 484 + 242 | 111X | 1-16 |
| 64-79 | 484 + 996 | XX11 1111 | 1-16 |
| 80-95 | 484 + 996 | 11XX 1111 | 1-16 |
| 96-111 | 484 + 996 | 1111 XX11 | 1-16 |
| 112-127 | 484 + 996 | 1111 11XX | 1-16 |
| 128-143 | 484 + 242 + 996 | X111 1111 | 1-16 |
| 144-159 | 484 + 242 + 996 | 1X11 1111 | 1-16 |
| 160-175 | 484 + 242 + 996 | 11X1 1111 | 1-16 |
| 176-191 | 484 + 242 + 996 | 111X 1111 | 1-16 |
| 192-207 | 484 + 242 + 996 | 1111 X111 | 1-16 |
| 208-223 | 484 + 242 + 996 | 1111 1X11 | 1-16 |
| 224-239 | 484 + 242 + 996 | 1111 11X1 | 1-16 |
| 240-255 | 484 + 242 + 996 | 1111 111X | 1-16 |
| 256-271 | 484 + 996 + 996 | XX11 1111 1111 | 1-16 |
| 272-287 | 484 + 996 + 996 | 11XX 1111 1111 | 1-16 |
| 288-303 | 484 + 996 + 996 | 1111 XX11 1111 | 1-16 |
| 304-319 | 484 + 996 + 996 | 1111 11XX 1111 | 1-16 |
| 320-335 | 484 + 996 + 996 | 1111 1111 XX11 | 1-16 |
| 336-351 | 484 + 996 + 996 | 1111 1111 11XX | 1-16 |
| 352-367 | — + 996 + 996 | XXXX 1111 1111 | 1-16 |
| 368-383 | — + 996 + 996 | 1111 XXXX 1111 | 1-16 |
| 384-399 | — + 996 + 996 | XXXX 1111 1111 | 1-16 |
| 400-415 | 484 + 996 + 996 + 996 | XX11 1111 1111 1111 | 1-16 |
| 416-431 | 484 + 996 + 996 + 996 | 11XX 1111 1111 1111 | 1-16 |
| 432-447 | 484 + 996 + 996 + 996 | 1111 XX11 1111 1111 | 1-16 |
| 448-463 | 484 + 996 + 996 + 996 | 1111 11XX 1111 1111 | 1-16 |
| 464-479 | 484 + 996 + 996 + 996 | 1111 1111 XX11 1111 | 1-16 |
| 480-495 | 484 + 996 + 996 + 996 | 1111 1111 11XX 1111 | 1-16 |
| 496-511 | 484 + 996 + 996 + 996 | 1111 1111 1111 XX11 | 1-16 |
| 512-527 | 484 + 996 + 996 + 996 | 1111 1111 1111 11XX | 1-16 |
| 528-543 | — + 996 + 996 + 996 | XXXX 1111 1111 1111 | 1-16 |
| 544-559 | — + 996 + 996 + 996 | 1111 XXXX 1111 1111 | 1-16 |
| 560-575 | — + 996 + 996 + 996 | XXXX 1111 1111 1111 | 1-16 |
| 576-591 | — + 996 + 996 + 996 | 1111 1111 1111 XXXX | 1-16 |

In the 802.11ax standard, in the non-compression mode, an HE-SIG-A field is used to indicate a quantity of symbols of an HE-SIG-B field. In the compression mode, the HE-SIG-A field is used to indicate the number of MU-MIMO users. In the compression mode, a quantity of symbols in the HE-SIG-B field is calculated based on the number of MU-MIMO users. However, in this embodiment of this application, because there are a plurality of segments, quantities of symbols of EHT-SIG fields in the segments need to be aligned. For example, the transmission bandwidth of the PPDU is divided into four segments. Quantities of symbols in an EHT-SIG field 1 on a segment 1 to an EHT-SIG field 4 on a segment 4 need to be consistent. If the access point calculates, based on the number of MU-MIMO users of the segment 1, that number of EHT-SIG Symbols 1 is 7, the access point calculates, based on the number of MU-MIMO users of the segment 2, that number of EHT-SIG Symbols 2 is 5; the access point calculates, based on the number of MU-MIMO users of the segment 3, that number of EHT-SIG Symbols 3 is 4; and the access point calculates, based on the number of MU-MIMO users of the segment 4, that number of EHT-SIG Symbols 4 is 4. In this case, when the access point generates the PPDU, to align the quantities of the symbols in the EHT-SIG field 1 to the EHT-SIG field 4 on the segment 4, padding needs to be performed for quantities of symbols in the EHT-SIG field 2 to the EHT-SIG field 4 to obtain 7 symbols. After receiving the EHT-SIG field 2, a station in the segment 2 calculates that the number of EHT-SIG Symbols 2 is 5 based on the number of MU-MIMO users. Actually, the number of EHT-SIG Symbols 2 is 7. However, the station of the segment 2 mistakenly considers that the number of EHT-SIG Symbols 2 is 5. Stations in the segment 3 and the segment 4 also incorrectly determine the quantities of symbols in their EHT-SIG fields. Therefore, in this embodiment of this application, the number of EHT-SIG Symbols is carried in the U-SIG field, and the number of EHT-SIG Symbols can be directly notified to the station, so that the station can accurately determine the number of EHT-SIG Symbols.

In a possible implementation, the U-SIG field is further used to indicate the number of EHT-SIG Symbols. The PPDU further includes a first field carried on the segment, where the first field is used to indicate the number of MU-MIMO users. The first field is different from the preamble puncturing indication field. In this possible implementation, a field different from the preamble puncturing indication field in the PPDU may be used to indicate the number of MU-MIMO users. In this possible implementation, the access point can directly notify the station of the number of EHT-SIG Symbols, so that the station can accurately determine the number of EHT-SIG Symbols.

The foregoing describes that the EHT-SIG field may be compressed at a granularity of segments. The following describes related content of compressing the EHT-SIG field at a granularity of an entire transmission bandwidth of the PPDU.

Figure 28:
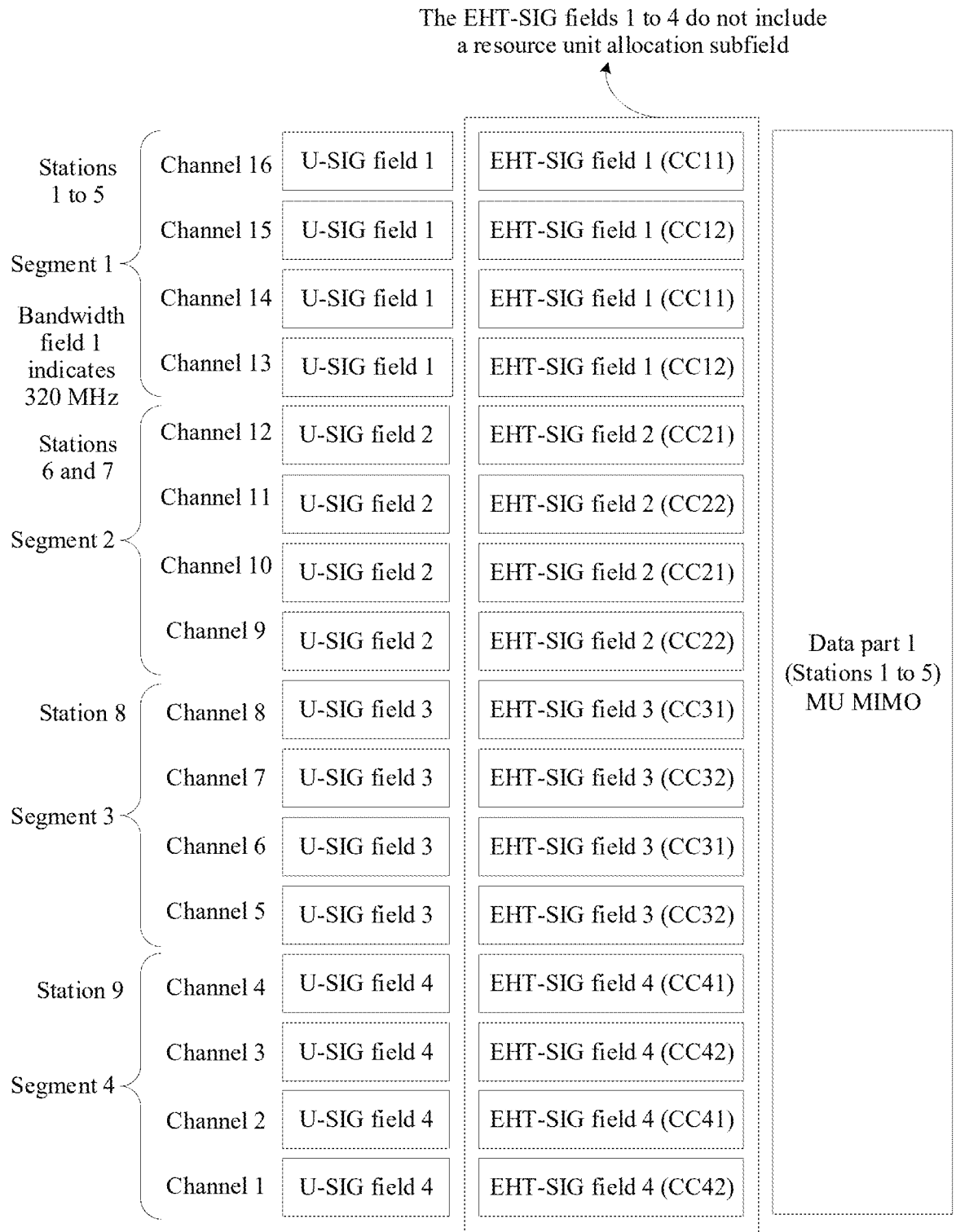
FIG. 28 is a schematic diagram depicting another frame structure of a PPDU according to an embodiment of this application.

In a possible implementation, if the transmission bandwidth of the PPDU is used for non-OFDMA transmission, the compression field indicates the compression mode. In other words, the compression field indicates the compression mode only when the entire transmission bandwidth of the PPDU is used for non-orthogonal frequency division multiple access (OFDMA) transmission. In this way, signaling overheads of PPDU transmission are reduced. For example, as shown in FIG. 28, 320-MHz transmission bandwidth of the PPDU is allocated as entirety to stations 1 to 5 for MU-MIMO transmission. Compression fields in a segment 1 to a segment 4 all indicate the compression mode, and none of an EHT-SIG field 1 in the segment 1 to an EHT-SIG field 4 in the segment 4 include a resource unit allocation subfield.

In a possible implementation, EHT-SIG fields carried on the plurality of segments of the PPDU are the same. For example, the EHT-SIG field 1 to the EHT-SIG field 4 shown in FIG. 28 are the same. Based on this possible implementation, the stations 1 to 5 may alternatively receive an EHT-SIG field on another segment. This can improve reliability of transmission of the EHT-SIG field.

In a possible implementation, EHT-SIG fields of a same segment are the same on different channels of the segment. For example, as shown in FIG. 28, content of the EHT-SIG field 1 on a channel 13 to a channel 16 is the same. Content of an ENT-SIG field 2 on a channel 9 to a channel 12 is the same. Content of an EHT-SIG field 3 on a channel 5 to a channel 8 is the same. Content of an EHT-SIG field 4 on a channel 1 to a channel 4 is the same. This possible implementation can improve reliability of EHT-SIG field transmission.

In a possible implementation, the compression field indicates the compression mode, and the U-SIG field is further used to indicate the number of MU-MIMO users. In this possible implementation, a U-SIG field of each segment indicates the number of MU-MIMO users. In this possible implementation, the number of EHT-SIG Symbols can be accurately determined based on the number of MU-MIMO users, with no additional signaling carried. This helps reduce signaling overheads.

In a possible implementation, the compression field indicates a compression mode, the EHT-SIG field includes a preamble puncturing indication field, and the preamble puncturing indication field is used to indicate a puncturing status of the transmission bandwidth of the PPDU. The mapping relationship listed in Table 3 may be used to indicate the puncturing status of the transmission bandwidth of the PPDU. In this possible implementation, using the preamble puncturing indication field, instead of the resource unit allocation subfield, to indicate resource unit allocation for a station helps reduce signaling overheads of PPDU transmission.

Figure 29:
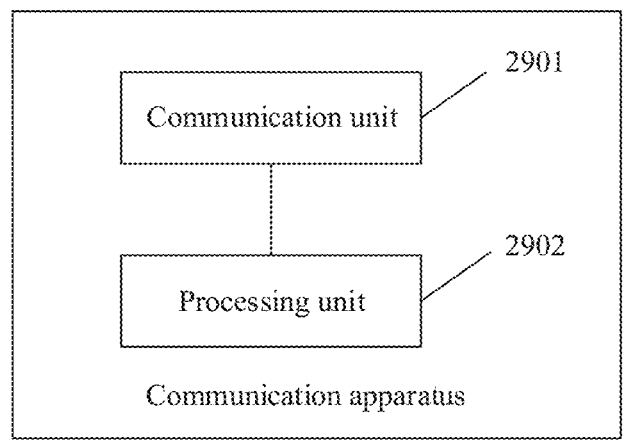
FIG. 29 is a schematic diagram depicting a structure of a communication apparatus according to an embodiment of this application.

FIG. 29 is a schematic diagram depicting a structure of a communication apparatus according to an embodiment of this application. The communication apparatus shown in FIG. 29 may be configured to perform some or all functions of the access point in the method embodiment described in FIG. 12. The apparatus may be an access point, an apparatus in an access point, or an apparatus that can be used together with an access point. The communication apparatus may be alternatively a chip system. The communication apparatus shown in FIG. 29 may include a communication unit 2901 and a processing unit 2902. The communication unit may alternatively be referred to as a transceiver unit, or the communication unit includes a receiving unit and a sending unit. The processing unit 2902 is configured to perform data processing.

The processing unit 2902 is configured to generate a physical layer protocol data unit PPDU, where a transmission bandwidth of the PPDU is divided into a plurality of segments. The PPDU includes a universal signal U-SIG field carried on a segment. The U-SIG field includes a bandwidth field. The bandwidth field indicates a channel bandwidth of a resource unit allocated to a station parked in the segment. The communication unit 2901 sends the PPDU to the station.

In a possible implementation, the PPDU further includes an EHT-SIG field carried on the segment. The EHT-SIG field includes a resource unit allocation subfield. The bandwidth indicated by the bandwidth field corresponds to a quantity of resource unit allocation subfields included in the EHT-SIG field. The resource unit allocation subfield is used to indicate the resource unit allocated to the station parked in the segment.

In a possible implementation, if the bandwidth indicated by the bandwidth field is 40 MHz, the U-SIG field and the EHT-SIG field are transmitted at the bandwidth of 40 MHz.

In a possible implementation, there may be one or more of the following correspondences between the bandwidth indicated by the bandwidth field and the quantity of resource unit allocation subfields included in the EHT-SIG field. If the bandwidth indicated by the bandwidth field is 20 megahertz MHz, the quantity of resource unit allocation subfields included in the EHT-SIG field is 1. If the bandwidth indicated by the bandwidth field is 40 MHz, the quantity of resource unit allocation subfields included in the EHT-SIG field is 2. If the bandwidth indicated by the bandwidth field is 80 MHz, the quantity of resource unit allocation subfields included in the EHT-SIG field is 4. If the bandwidth indicated by the bandwidth field is 160 MHz, the quantity of resource unit allocation subfields included in the EHT-SIG field is 8. If the bandwidth indicated by the bandwidth field is 240 MHz, the quantity of resource unit allocation subfields included in the EHT-SIG field is 12. If the bandwidth indicated by the bandwidth field is 320 MHz, the quantity of resource unit allocation subfields included in the EHT-SIG field is 16.

In a possible implementation, the EHT-SIG field includes a preamble puncturing indication field, and the preamble puncturing indication field is used to indicate a puncturing status of the channel bandwidth indicated by the bandwidth field.

In a possible implementation, the U-SIG field further includes a compression field. When the compression field indicates a compression mode, the EHT-SIG field includes the preamble puncturing indication field.

In a possible implementation, when a resource of the station parked in the segment is used for non-OFDMA transmission, the compression field indicates the compression mode.

In a possible implementation, the U-SIG field is further used to indicate the number of EHT-SIG Symbols. The preamble puncturing indication field is further used to indicate the number of multi-user multiple-input multiple-output MU-MIMO users.

In a possible implementation, the U-SIG field is further used to indicate the number of EHT-SIG Symbols. The PPDU further includes a first field carried on the segment, where the first field is used to indicate the number of multi-user multiple-input multiple-output MU-MIMO users. The first field is different from the preamble puncturing indication field.

In a possible implementation, the PPDU further includes an EHT-SIG field carried on the segment. The U-SIG field further includes a compression field. If the transmission bandwidth of the PPDU is used for non-OFDMA transmission, the compression field indicates a compression mode.

In a possible implementation, if the compression field indicates the compression mode, the U-SIG field is further used to indicate the number of multi-user multiple-input multiple-output MU-MIMO users.

In a possible implementation, if the compression field indicates the compression mode, the EHT-SIG field includes a preamble puncturing indication field, and the preamble puncturing indication field is used to indicate a puncturing status of the transmission bandwidth of the PPDU.

In a possible implementation, EHT-SIG fields carried on the plurality of segments of the PPDU are the same.

FIG. 29 is a schematic diagram depicting a structure of a communication apparatus according to an embodiment of this application. The communication apparatus shown in FIG. 29 may be configured to perform some or all functions of the access point in the method embodiment described in FIG. 12. The apparatus may be a station, an apparatus in a station, or an apparatus that can be used together with a station. The communication apparatus may be alternatively a chip system. The communication apparatus shown in FIG. 29 may include a communication unit 2901 and a processing unit 2902. The communication unit may alternatively be referred to as a transceiver unit, or the communication unit includes a receiving unit and a sending unit. The processing unit 2902 is configured to perform data processing.

The communication unit 2901 receives a physical layer protocol data unit PPDU sent by an access point, where a transmission bandwidth of the PPDU is divided into a plurality of segments. The PPDU includes a universal signal U-SIG field carried on a segment. The U-SIG field includes a bandwidth field, and the bandwidth field indicates a channel bandwidth of a resource unit allocated to a station parked in the segment. The processing unit 2902 determines the channel bandwidth of the allocated resource unit based on the received U-SIG field.

In a possible implementation, the PPDU further includes an EHT-SIG field carried on the segment. The EHT-SIG field includes a resource unit allocation subfield. The bandwidth indicated by the bandwidth field corresponds to a quantity of resource unit allocation subfields included in the EHT-SIG field. The resource unit allocation subfield is used to indicate the resource unit allocated to the station parked in the segment.

In a possible implementation, if the bandwidth indicated by the bandwidth field is 40 MHz, the U-SIG field and the EHT-SIG field are transmitted at the bandwidth of 40 MHz.

In a possible implementation, there may be one or more of the following correspondences between the bandwidth indicated by the bandwidth field and the quantity of resource unit allocation subfields included in the EHT-SIG field. If the bandwidth indicated by the bandwidth field is 20 megahertz MHz, the quantity of resource unit allocation subfields included in the EHT-SIG field is 1. If the bandwidth indicated by the bandwidth field is 40 MHz, the quantity of resource unit allocation subfields included in the EHT-SIG field is 2. If the bandwidth indicated by the bandwidth field is 80 MHz, the quantity of resource unit allocation subfields included in the EHT-SIG field is 4. If the bandwidth indicated by the bandwidth field is 160 MHz, the quantity of resource unit allocation subfields included in the EHT-SIG field is 8. If the bandwidth indicated by the bandwidth field is 240 MHz, the quantity of resource unit allocation subfields included in the EHT-SIG field is 12. If the bandwidth indicated by the bandwidth field is 320 MHz, the quantity of resource unit allocation subfields included in the EHT-SIG field is 16.

In a possible implementation, the EHT-SIG field includes a preamble puncturing indication field, and the preamble puncturing indication field is used to indicate a puncturing status of the channel bandwidth indicated by the bandwidth field.

In a possible implementation, the U-SIG field further includes a compression field. When the compression field indicates a compression mode, the EHT-SIG field includes the preamble puncturing indication field.

In a possible implementation, when a resource of the station parked in the segment is used for non-OFDMA transmission, the compression field indicates the compression mode.

In a possible implementation, the U-SIG field is further used to indicate the number of EHT-SIG Symbols. The preamble puncturing indication field is further used to indicate the number of multi-user multiple-input multiple-output MU-MIMO users.

In a possible implementation, the U-SIG field is further used to indicate the number of EHT-SIG Symbols. The PPDU further includes a first field carried on the segment, where the first field is used to indicate the number of multi-user multiple-input multiple-output MU-MIMO users. The first field is different from the preamble puncturing indication field.

In a possible implementation, the PPDU further includes an EHT-SIG field carried on the segment. The U-SIG field further includes a compression field. If the transmission bandwidth of the PPDU is used for non-OFDMA transmission, the compression field indicates a compression mode.

In a possible implementation, if the compression field indicates the compression mode, the U-SIG field is further used to indicate the number of multi-user multiple-input multiple-output MU-MIMO users.

In a possible implementation, if the compression field indicates the compression mode, the EHT-SIG field includes a preamble puncturing indication field, and the preamble puncturing indication field is used to indicate a puncturing status of the transmission bandwidth of the PPDU.

In a possible implementation, EHT-SIG fields carried on the plurality of segments of the PPDU are the same.

Figure 30A:
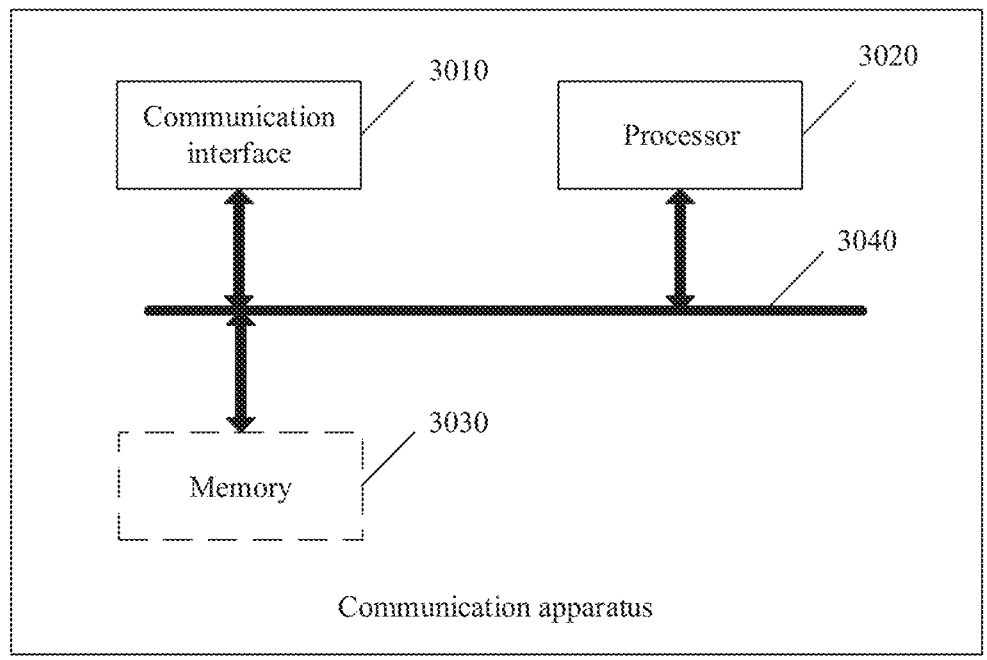
FIG. 30a is a schematic diagram depicting another structure of a communication apparatus according to an embodiment of this application.

FIG. 30a shows a communication apparatus 300 according to an embodiment of this application. The communication apparatus is configured to implement functions of the station or the access point in the method embodiment shown in FIG. 12. The apparatus may be a station or an access point, or the apparatus may be an apparatus used in a station or an apparatus used in an access point. The apparatus used in the station may be a chip system in the station or a chip in the station. The apparatus used in the access point may be a chip system in the access point or a chip in the access point. The chip system may include a chip, or may include a chip and another discrete component.

The communication apparatus 300 includes at least one processor 3020, configured to implement a data processing function of the station or the access point in the foregoing bandwidth indication method applied in a wireless local area network in this application.

The apparatus 300 may further include a communication interface 3010, configured to implement a transceiver operation of the station or the access point in the foregoing bandwidth indication method applied in a wireless local area network in this application.

In the embodiments of this application, the communication interface may be a transceiver, a circuit, a bus, a module, or a communication interface of another type. The communication interface is configured to communicate with another device through a transmission medium. For example, the communication interface 3010 is used by an apparatus in the apparatus 300 to communicate with another device. The processor 3020 receives and sends data through the communication interface 3010, and is configured to implement the method in the foregoing method embodiments.

The apparatus 300 may further include at least one memory 3030, configured to store program instructions and/or data. The memory 3030 is coupled to the processor 3020. Coupling described in this embodiment of this application may be indirect coupling or a communication connection between apparatuses, units, or modules in an electrical form, a mechanical form, or another form. Coupling is used for information exchange between the apparatuses, the units, or the modules. The processor 3020 may collaborate with the memory 3030 together. The processor 3020 may execute the program instructions stored in the memory 3030. At least one of the at least one memory may be included in the processor.

In this embodiment of this application, a specific connection medium between the communication interface 3010, the processor 3020, and the memory 3030 is not limited. In this embodiment of this application, the memory 3030, the processor 3020, and the communication interface 3010 are connected through a bus 3040 in FIG. 30a, and the bus is represented by a bold line in FIG. 30a. A manner of connection between other components is schematically described, and is not limited thereto. The bus may be classified into an address bus, a data bus, a control bus, and the like. For ease of representation, only one thick line is used to represent the bus in FIG. 30a, but this does not mean that there is only one bus or only one type of bus.

When the apparatus 300 is specifically an apparatus used in a station or an access point, for example, when the apparatus 300 is specifically a chip or a chip system, the communication interface 3010 may output or receive a baseband signal. When the apparatus 300 is specifically a station or an access point, the communication interface 3010 may output or received a radio frequency signal. In the embodiments of this application, the processor may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

Figure 30B:
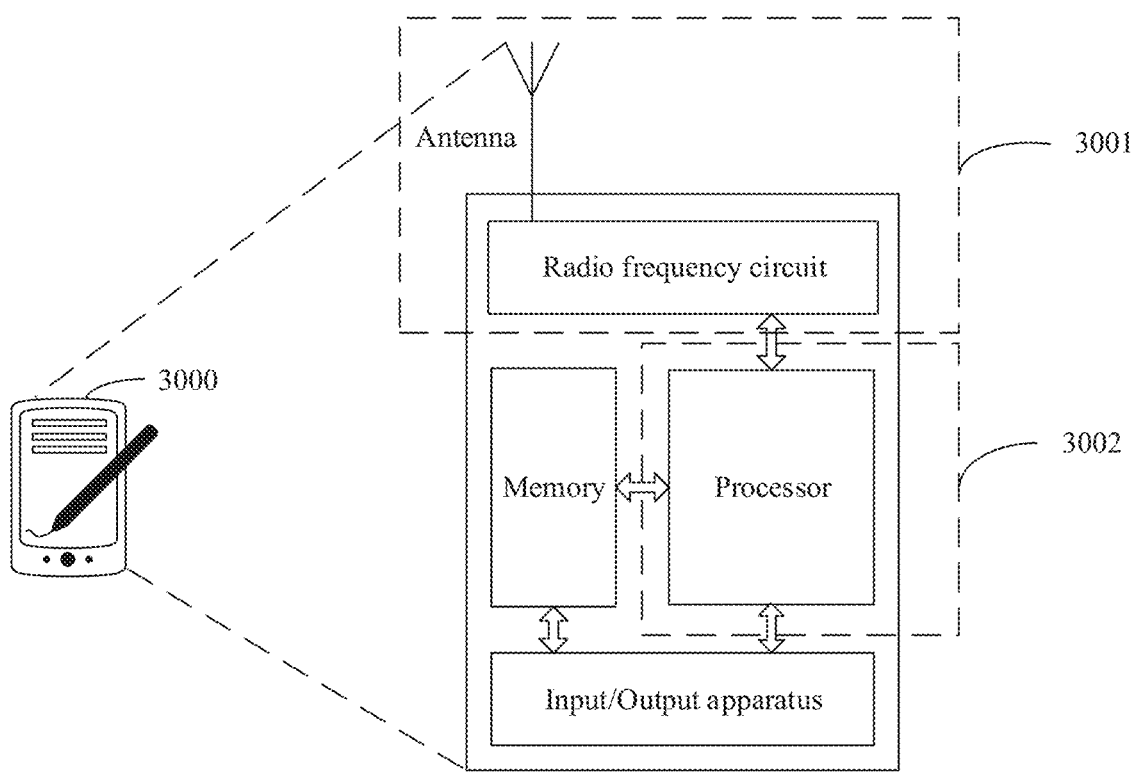
FIG. 30b is a schematic diagram depicting still another structure of a communication apparatus according to an embodiment of this application.

For example, FIG. 30b is a schematic diagram depicting a structure of another station 3000 according to an embodiment of this application. The station may perform operations performed by the station in FIG. 12.

For ease of description, FIG. 30b shows only main components of the station. As shown in FIG. 30b, the station 3000 includes a processor, a memory, a radio frequency circuit, an antenna, and an input/output apparatus. The processor is mainly configured to process a communication protocol and communication data, control the entire station, execute a software program, and process data of the software program. For example, the processor supports the station to perform the operations performed by the station in the procedure described in FIG. 12. The memory is mainly configured to store the software program and the data. The radio frequency circuit is mainly configured for conversion between a baseband signal and a radio frequency signal, and process the radio frequency signal. The antenna is mainly configured to receive and send the radio frequency signal in a form of electromagnetic waves. The station 3000 may further include an input/output apparatus to receive data entered by a user and output data to the user, for example, a touchscreen, a display screen, or a keyboard. It should be noted that some types of stations may not be provided with an input/output apparatus.

After the station is powered on, the processor may read the software program in a storage unit, parse and execute instructions of the software program, and process the data of the software program. When data needs to be wirelessly sent, the processor outputs a baseband signal to the radio frequency circuit after performing baseband processing on the to-be-sent data. The radio frequency circuit sends a radio frequency signal, obtained by performing radio frequency processing on the baseband signal, in a form of electromagnetic waves through the antenna. When data is sent to the station, the radio frequency circuit receives the radio frequency signal through the antenna, converts the radio frequency signal into a baseband signal, and outputs the baseband signal to the processor. The processor converts the baseband signal into data for processing.

Persons skilled in the art may understand that for ease of description, FIG. 30b shows only one memory and one processor. An actual station may include a plurality of processors and memories. The memory may also be referred to as a storage medium, a storage device, or the like. This is not limited in this embodiment of this application.

In an optional implementation, the processor may include a baseband processor and a central processing unit (central processing unit, CPU). The baseband processor is mainly configured to process a communication protocol and communication data. The CPU is mainly configured to: control the entire station, execute a software program, and process data of the software program. Optionally, the processor may be alternatively a network processor (network processor, NP) or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof. The memory may include a volatile memory (volatile memory) such as a random access memory (random-access memory, RAM). The memory may alternatively include a non-volatile memory (non-volatile memory) such as a flash memory (flash memory), a hard disk drive (hard disk drive, HDD), or a solid-state drive (solid-state drive, SSD). The memory may alternatively include a combination of the foregoing types of memories.

For example, in this embodiment of this application, as shown in FIG. 30b, the antenna and the radio frequency circuit with a transceiver function may be considered as a communication unit 3001 of the station 3000, and the processor with a processing function may be considered as a processing unit 3002 of the station 3000.

The communication unit 3001 may alternatively be referred to as a transceiver, a transceiver apparatus, a transceiver unit, or the like, and is configured to implement the transceiver function. Optionally, a component of the communication unit 3001 for implementing a receiving function may be considered as a receiving unit, and a component of the communication unit 3001 for implementing a sending function may be considered as a sending unit. In other words, the communication unit 3001 includes the receiving unit and the sending unit. For example, the receiving unit may also be referred to as a receiving device, a receiver, a receiving circuit, or the like; and the sending unit may be referred to as a transmitting device, a transmitter, a transmitting circuit, or the like.

In some embodiments, the communication unit 3001 and the processing unit 3002 may be integrated into one device, or may be separated as different devices. In addition, the processor and the memory may be integrated into one device, or may be separated as different devices.

The communication unit 3001 may be configured to perform the transceiver operation of the station in the foregoing method embodiment. The processing unit 3002 may be configured to perform the data processing operation of the station in the foregoing method embodiments.

An embodiment of this application provides a computer-readable storage medium. The computer-readable storage medium stores instructions. When the instructions are run on a computer, the instructions are configured to perform the method performed by the station in the foregoing method embodiments.

An embodiment of this application provides a computer-readable storage medium. The computer-readable storage medium stores instructions. When the instructions are run on a computer, the instructions are configured to perform the method performed by the access point in the foregoing method embodiments.

An embodiment of this application further provides a computer program product. When the computer program product runs on a processor, the computer program product is configured to perform the method performed by the station in the foregoing method embodiments.

An embodiment of this application further provides a computer program product. When the computer program product runs on a processor, the computer program product is configured to perform the method performed by the access point in the foregoing method embodiments.

Based on a same inventive concept, a problem-resolving principle of the apparatus provided in this embodiment of this application is similar to that of the method embodiments of this application. Therefore, for implementation of the apparatus, refer to the implementation of the methods. For brevity of description, details are not described herein again.

It should be noted that, for brief description, the foregoing method embodiments are represented as a combination of a series of actions. However, persons skilled in the art should appreciate that this application is not limited to the described order of the actions, because according to this application, some steps may be performed in other orders or simultaneously. It should be further appreciated by persons skilled in the art that the related actions and modules are not necessarily required in this application.

Description of the embodiments provided in this application may refer to each other, and description of the embodiments has different focuses. For a part not described in detail in an embodiment, refer to related description in another embodiment. For ease of description and brevity, for functions and performed steps of the apparatuses and devices provided in the embodiments of this application, refer to related description in the method embodiments of this application. Mutual reference, combination, or reference may be made between the method embodiments and between the apparatus embodiments.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A communication method applied in a wireless local area network, wherein the method comprises:
    generating, by a communication apparatus, a physical layer protocol data unit (PPDU), wherein a transmission bandwidth of the PPDU is divided into a plurality of segments, the PPDU comprises multiple universal signal (U-SIG) fields and multiple extremely high throughput-signal (EHT-SIG) fields, wherein the multiple U-SIG fields and the multiple EHT-SIG fields are carried on more than one segment of the plurality of segments, the entire transmission bandwidth of the PPDU is used for single-user (SU) transmission or multi-user multiple-input multiple-output (MU-MIMO) transmission in non-OFDMA transmission, each of the multiple U-SIG fields indicates a number of EHT-SIG symbols, numbers of EHT-SIG symbols indicated by the multiple U-SIG fields are the same in the more than one segment of the plurality of segments, and each of the multiple EHT-SIG fields comprises a field indicating a number of MU-MIMO users, wherein each of the multiple U-SIG fields further comprises a compression field, the compression field indicates a compression mode, and each of the multiple EHT-SIG fields does not include a resource unit allocation subfield; and
    sending, by the communication apparatus, the PPDU to a station.

2. The method according to claim 1, wherein the PPDU comprises a plurality of EHT-SIG fields carried on different segments, and the plurality of EHT-SIG fields are the same.

3. The method according to claim 1, wherein the PPDU comprises a plurality of EHT-SIG fields carried on different channels in a same segment, and the plurality of EHT-SIG fields are the same.

4. The method according to claim 3, wherein each channel of the different channels is 20 MHz.

5. The method according to claim 1, wherein at least one segment of the plurality of segments is 80 MHz.

6. The method according to claim 1, wherein the sending, by the communication apparatus, the PPDU to the station, comprises:

sending, by the communication apparatus, the PPDU to the station in the compression mode.

7. A communication apparatus, comprising at least one processor and at least one memory, wherein the at least one memory is configured to store computer-executable instructions for execution by the at least one processor to perform operations comprising:

generating, by a communication apparatus, a physical layer protocol data unit (PPDU), wherein a transmission bandwidth of the PPDU is divided into a plurality of segments, the PPDU comprises multiple universal signal (U-SIG) fields and multiple extremely high throughput-signal (EHT-SIG) fields, wherein the multiple U-SIG fields and the multiple EHT-SIG fields are carried on more than one segment of the plurality of segments, the entire transmission bandwidth of the PPDU is used for single-user (SU) transmission or multi-user multiple-input multiple-output (MU-MIMO) transmission in non-OFDMA transmission, each of the multiple U-SIG fields indicates a number of EHT-SIG symbols, numbers of EHT-SIG symbols indicated by the multiple U-SIG fields are the same in the more than one segment of the plurality of segments, and each of the multiple EHT-SIG fields comprises a field indicating a number of MU-MIMO users, wherein each of the multiple U-SIG fields further comprises a compression field, the compression field indicates a compression mode, and each of the multiple EHT-SIG fields does not include a resource unit allocation subfield; and sending the PPDU to a station.

8. The communication apparatus according to claim 7, wherein the PPDU comprises a plurality of EHT-SIG fields carried on different segments, and the plurality of EHT-SIG fields are the same.

9. The communication apparatus according to claim 7, wherein the PPDU comprises a plurality of EHT-SIG fields carried on different channels in a same segment, and the plurality of EHT-SIG fields are the same.

10. The communication apparatus according to claim 9, wherein each channel of the different channels is 20 MHz.

11. The communication apparatus according to claim 7, wherein at least one segment of the plurality of segments is 80 MHz.

12. The communication apparatus according to claim 7, wherein the sending the PPDU to the station comprises:

sending the PPDU to the station in the compression mode.

13. A non-transitory computer-readable storage medium, wherein the computer-readable storage medium is configured to store computer-executable instructions, and when the computer-executable instructions are executed by a computer, the computer is enabled to perform the following operations:

generating, by a communication apparatus, a physical layer protocol data unit (PPDU), wherein a transmission bandwidth of the PPDU is divided into a plurality of segments, the PPDU comprises multiple universal signal (U-SIG) fields and multiple extremely high throughput-signal (EHT-SIG) fields, wherein the multiple U-SIG fields and the multiple EHT-SIG fields are carried on more than one segment of the plurality of segments, the entire transmission bandwidth of the PPDU is used for single-user (SU) transmission or multi-user multiple-input multiple-output (MU-MIMO) transmission in non-OFDMA transmission, each of the multiple U-SIG fields indicates a number of EHT-SIG symbols, numbers of EHT-SIG symbols indicated by the multiple U-SIG fields are the same in the more than one segment of the plurality of segments, and each of the multiple EHT-SIG fields comprises a field indicating a number of MU-MIMO users, wherein each of the multiple U-SIG fields further comprises a compression field, the compression field indicates a compression mode, and each of the multiple EHT-SIG fields does not include a resource unit allocation subfield; and sending the PPDU to a station.

14. The non-transitory computer-readable storage medium according to claim 13, wherein the PPDU comprises a plurality of EHT-SIG fields carried on different segments, and the plurality of EHT-SIG fields are the same.

15. The non-transitory computer-readable storage medium according to claim 13, wherein the PPDU comprises a plurality of EHT-SIG fields carried on different channels in a same segment, and the plurality of EHT-SIG fields are the same.

16. The non-transitory computer-readable storage medium according to claim 15, wherein each channel of the different channels is 20 MHz.

17. The non-transitory computer-readable storage medium according to claim 13, wherein at least one segment of the plurality of segments is 80 MHz.

18. The non-transitory computer-readable storage medium according to claim 13, wherein sending the PPDU to the station comprises:

sending the PPDU to the station in the compression mode.

* * * * *